(12) United States Patent
Futatsugi

(10) Patent No.: US 9,471,911 B2
(45) Date of Patent: Oct. 18, 2016

(54) INFORMATION PROCESSING APPARATUS AND INFORMATION PROCESSING METHOD

(71) Applicant: CANON KABUSHIKI KAISHA, Tokyo (JP)

(72) Inventor: Hajime Futatsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 13/785,749

(22) Filed: Mar. 5, 2013

(65) Prior Publication Data

US 2013/0241953 A1    Sep. 19, 2013

(30) Foreign Application Priority Data

Mar. 13, 2012  (JP) ................................ 2012-056490
Jul. 20, 2012   (JP) ................................ 2012-161963

(51) Int. Cl.
| G06Q 20/00 | (2012.01) |
|---|---|
| G06Q 20/12 | (2012.01) |
| G06T 11/60 | (2006.01) |
| G01C 21/32 | (2006.01) |
| G01C 21/36 | (2006.01) |
| G09B 29/00 | (2006.01) |

(52) U.S. Cl.
CPC ........... *G06Q 20/1235* (2013.01); *G01C 21/32* (2013.01); *G01C 21/367* (2013.01); *G06T 11/60* (2013.01); *G09B 29/007* (2013.01)

(58) Field of Classification Search
CPC ... G01C 21/00–21/3697; G06Q 10/00–50/34; G06F 17/30241; G09B 29/00–29/14
See application file for complete search history.

(56) References Cited

U.S. PATENT DOCUMENTS

| 7,769,745    | B2 * | 8/2010  | Naaman ............... G06F 17/3087 707/713 |
|---|---|---|---|
| 8,904,275    | B2 * | 12/2014 | Pilskalns ........... G06F 17/30241 715/230 |
| 2007/0271297 | A1 * | 11/2007 | Jaffe .................. G06F 17/30041 |
| 2010/0049704 | A1   | 2/2010  | Sumiya |
| 2011/0313649 | A1 * | 12/2011 | Bales ................... G01C 21/367 701/455 |
| 2013/0246409 | A1 * | 9/2013  | Polansky ........... G06F 17/30241 707/724 |

FOREIGN PATENT DOCUMENTS

| JP | 2002-288680 A | 10/2002 |
|---|---|---|
| JP | 2003-269967 A | 9/2003 |
| JP | 2003-288004 A | 10/2003 |
| JP | 2007-012030 A | 1/2007 |
| JP | 2010-049132 A | 3/2010 |

\* cited by examiner

*Primary Examiner* — Mohammad A Nilforoush
(74) *Attorney, Agent, or Firm* — Fitzpatrick, Cella, Harper & Scinto

(57) ABSTRACT

An information processing apparatus and method composites and displays a map image at a designated scale and an object associated with the map image at the designated scale. The apparatus and method count the number of times of designation with respect to a position on a map, and manage the number of times of designation in association with the position and the map. If the number of times of designation with respect to a position of interest on the map exceeds a threshold value, a position that is managed in association with a large-area map including an area shown by the map is specified, and an object in the specified position on the large-area map is highlighted on the large-area map.

15 Claims, 25 Drawing Sheets

FIG. 3

301 — MAP IMAGE DATA

| DATA NAME | DATA TYPE |
|---|---|
| 302 — LEVEL ID | Integer |
| 303 — TILE ID | Integer |
| 304 — TILE COORDINATE x1 | Integer |
| TILE COORDINATE y1 | Integer |
| TILE COORDINATE x2 | Integer |
| TILE COORDINATE y2 | Integer |
| 305 — IMAGE DATA BODY | Binary |

FIG. 4

401 — OBJECT DATA

| DATA NAME | DATA TYPE |
|---|---|
| 402 — OBJECT ID | Integer |
| 403 — LEVEL ID | Integer |
| 404 — TILE ID | Integer |
| 405 — OBJECT COORDINATE x | Integer |
| OBJECT COORDINATE y | Integer |
| 406 — ACTUAL OBJECT DATA | Text |

FIG. 5

| | | |
|---|---|---|
| 501 | DISPLAY SCALE DATA | |
| | DATA NAME | DATA TYPE |
| 502 | OBJECT ID | Integer |
| 503 | DISPLAY LEVEL ID | Integer |
| 504 | TILE ID | Integer |

FIG. 6

| | | |
|---|---|---|
| 601 | ADDITIONAL POSITION INFORMATION | |
| | DATA NAME | DATA TYPE |
| 602 | EVENT OCCURRENCE COORDINATE x | Integer |
| | EVENT OCCURRENCE COORDINATE y | Integer |
| 603 | EVENT OCCURRENCE NUMBER | Integer |

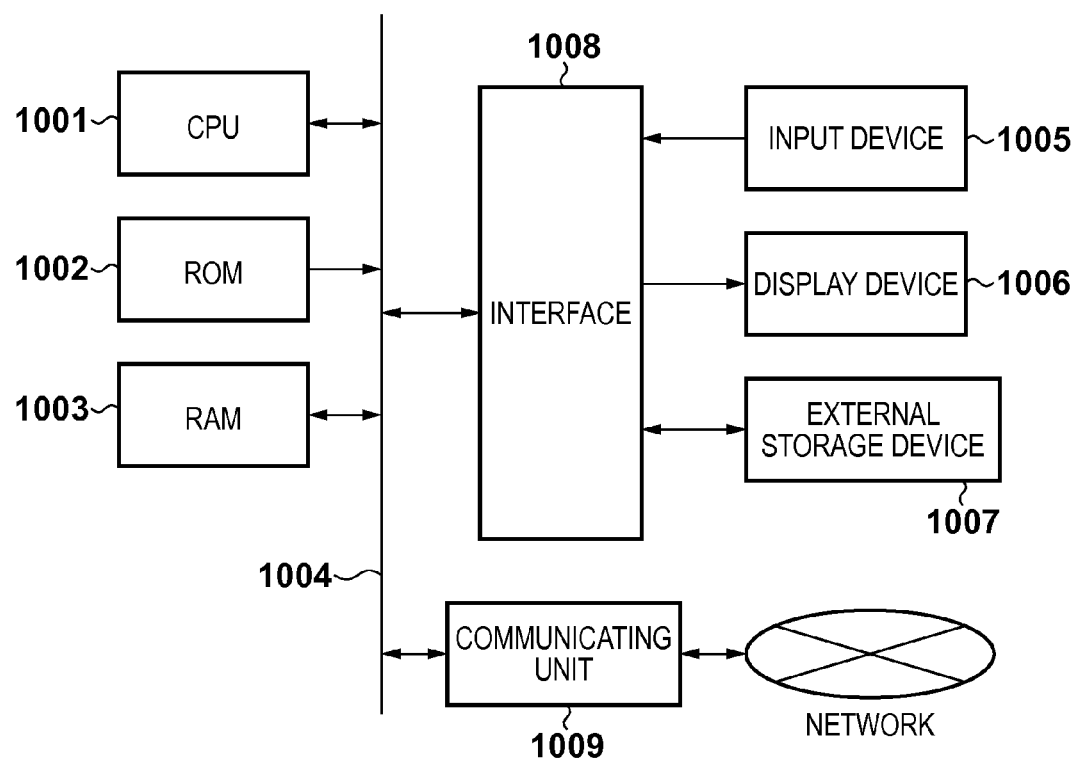
F I G. 10

FIG. 11A

| | | |
|---|---|---|
| 1101 | ADDITIONAL POSITION INFORMATION | |
| | DATA NAME | DATA TYPE |
| 602 | EVENT OCCURRENCE COORDINATE x | Integer |
| | EVENT OCCURRENCE COORDINATE y | Integer |
| 603 | EVENT OCCURRENCE NUMBER | Integer |
| 1104 | EVENT EXECUTION USER | Text |

FIG. 11B

| | | |
|---|---|---|
| 1102 | DISPLAY SCALE DATA | |
| | DATA NAME | DATA TYPE |
| 502 | OBJECT ID | Integer |
| 503 | DISPLAY LEVEL ID | Integer |
| 504 | TILE ID | Integer |
| 1105 | USER IDENTIFIER | Text |

FIG. 12

1201 — DISPLAY SCALE DATA

| DATA NAME | DATA TYPE |
|---|---|
| OBJECT ID | Integer |
| DISPLAY LEVEL ID | Integer |
| TILE ID | Integer |
| UPDATE COUNTER | Text |

502 — OBJECT ID
503 — DISPLAY LEVEL ID
504 — TILE ID
1205 — UPDATE COUNTER

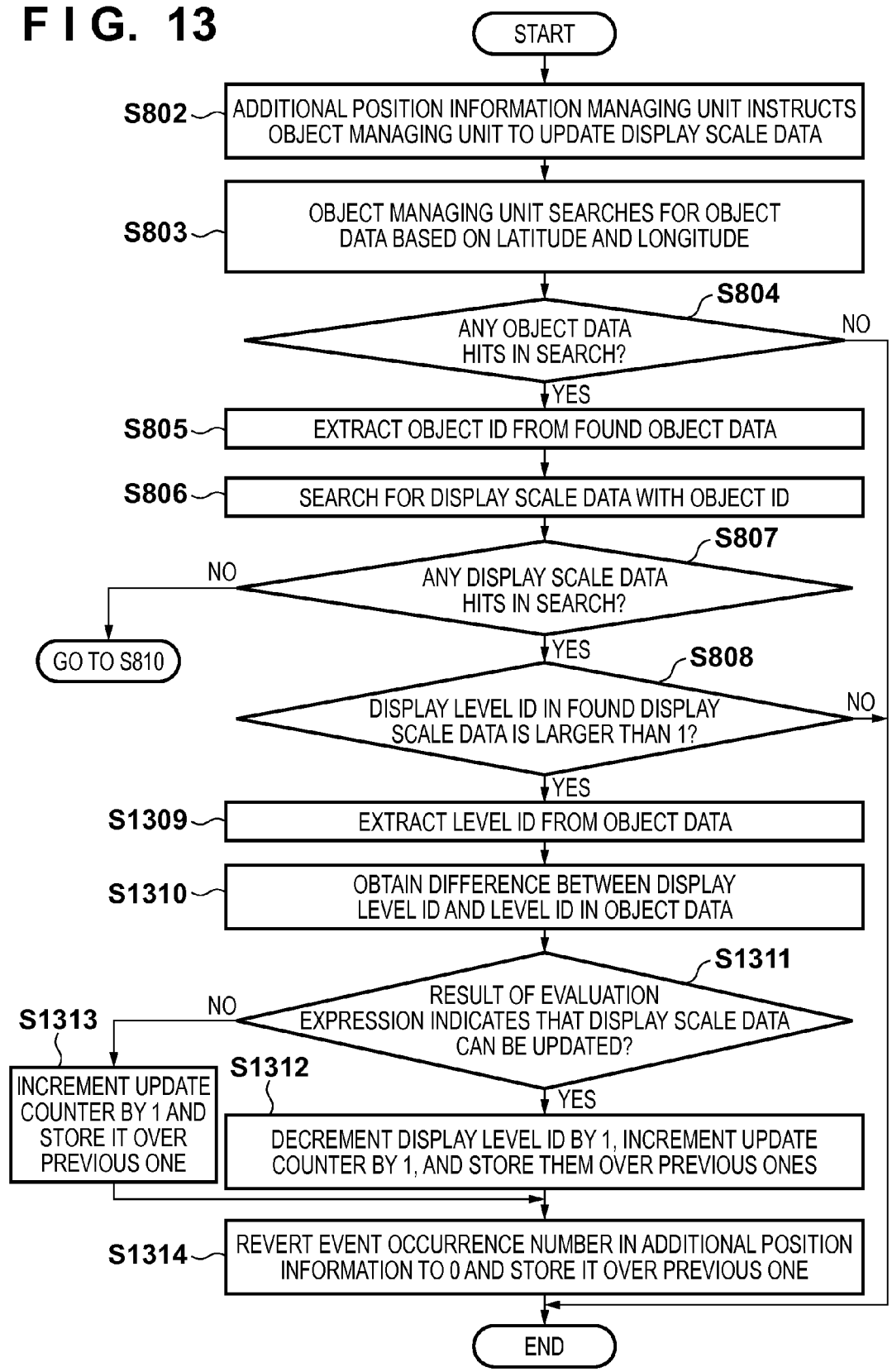

F I G. 14A
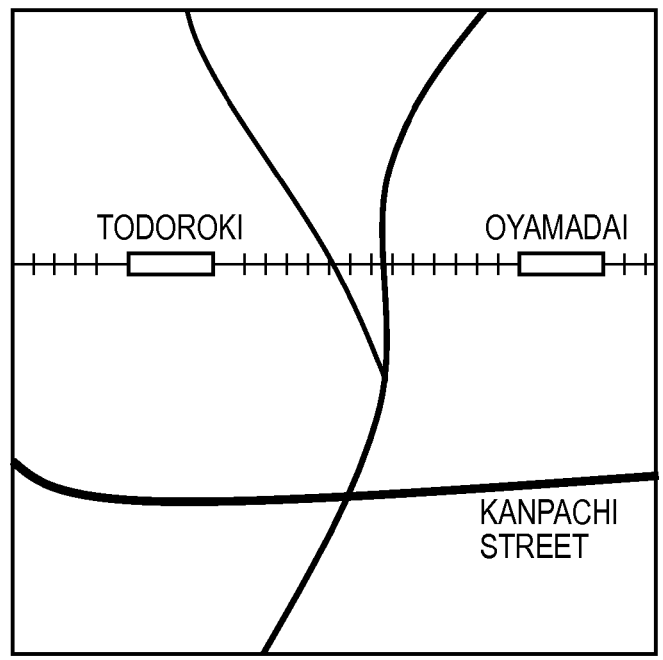
F I G. 14B
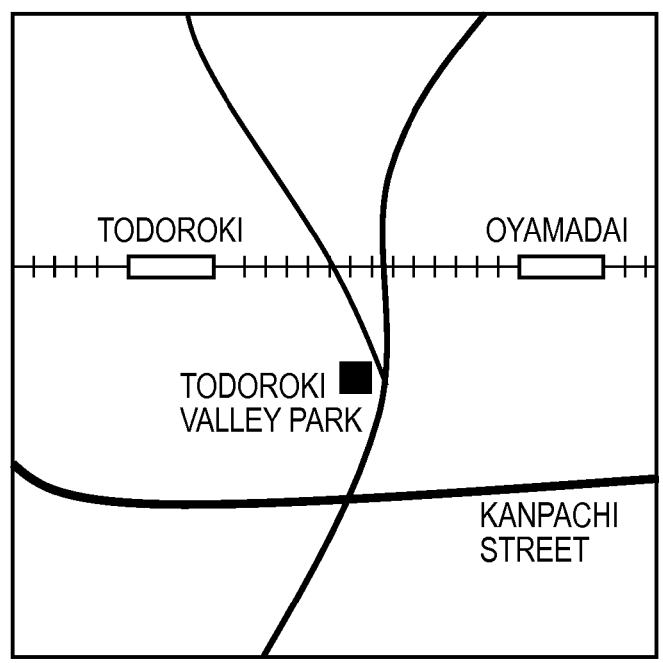

FIG. 16

1601 — ADDITIONAL POSITION INFORMATION

| DATA NAME | DATA TYPE |
|---|---|
| EVENT OCCURRENCE COORDINATE x | Integer |
| EVENT OCCURRENCE COORDINATE y | Integer |
| EVENT OCCURRENCE NUMBER | Integer |
| ASSOCIATED OBJECT ID | Integer |
| TILE ID | Integer |
| LEVEL ID | Integer |

- 1602: EVENT OCCURRENCE COORDINATE x, EVENT OCCURRENCE COORDINATE y
- 1603: EVENT OCCURRENCE NUMBER
- 1604: ASSOCIATED OBJECT ID
- 1605: TILE ID
- 1606: LEVEL ID

FIG. 17

1701 — INTER-OBJECT LINK INFORMATION

| DATA NAME | DATA TYPE |
|---|---|
| LINK SOURCE OBJECT ID | Integer |
| LINK TARGET OBJECT ID | Integer |
| LINK TARGET LEVEL ID | Integer |
| LINK TARGET TILE ID | Integer |

- 1702: LINK SOURCE OBJECT ID
- 1703: LINK TARGET OBJECT ID
- 1704: LINK TARGET LEVEL ID
- 1705: LINK TARGET TILE ID

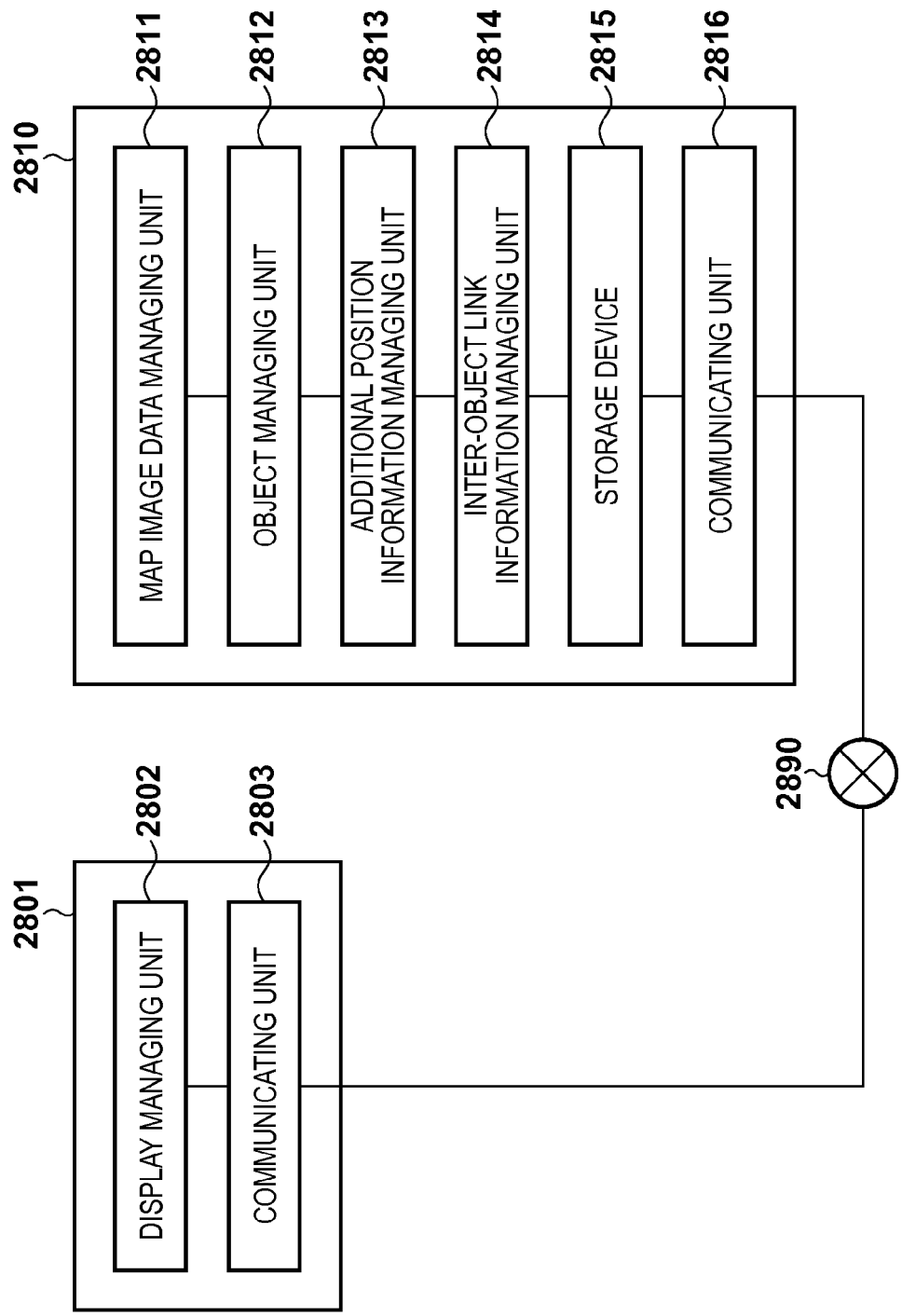

INFORMATION PROCESSING APPARATUS AND INFORMATION PROCESSING METHOD

BACKGROUND OF THE INVENTION

1. Field of the Invention

The present invention relates to techniques for displaying objects on maps that can be displayed at multiple scales.

2. Description of the Related Art

For maps that can be displayed at multiple scales, a method is used in which objects (data regarding place names, landmark names, map symbols, etc.) and scales at which these objects are displayed are managed in association with each other so that the objects to be displayed on the maps can be changed in accordance with the scales. As indexes concerning the scales to be associated with each object, the dimension, recognizability, or the like of the place indicated by the object is used. For example, famous landmarks are associated with a scale of 1 to 200,000, and other landmarks are associated with a scale of 1 to 50,000. In contrast, a technique of highlighting objects that have value to specific users has been proposed.

For example, Japanese Patent Laid-Open No. 2007-012030 discloses a technique of associating shop advertisement information with objects (icons) indicating shops, and changing the method for displaying the shop icons in accordance with the frequency of access to the advertisement information. Japanese Patent Laid-Open No. 2002-288680 discloses a technique of classifying objects into a plurality of categories and displaying or not displaying only objects that belong to a specific category within an area designated by a user.

Japanese Patent Laid-Open No. 2003-269967 discloses a method in which, in a car navigation system, when an intersection at which the car should turn is approaching during route guiding, objects around the intersection are displayed in detail by enlarging the displayed map in the vicinity of the intersection.

Here, the following two operations can be considered as typical operations performed by a user when searching for a specific object on the map.

1) To start the search in a large-area map first, and then gradually move to detailed maps.

2) To use mainly a name such as a place name or a landmark name as a reference.

In other words, as a result of the object that the user is searching for being displayed on a larger-area map, it is more likely that the user can find the object in a short time. However, in the aforementioned techniques, the association between objects and scales is fixed, and, in order to highlight an object, the map at the scale associated with this object needs to be displayed. Therefore, a problem arises in that the objects of places that are important for specific users but are generally not very recognizable are displayed only on a detailed map, and the search takes time.

Moreover, the method of highlighting objects using icons has the problem that there is less information useful for specifying places, compared with the method of displaying names. Specifically, in a system that searches for pictures taken at a specific place using a map, there is a problem with searchability in the method of displaying only icons or picture thumbnails at the imaging position.

SUMMARY OF THE INVENTION

The present invention was made in view of the foregoing problems, and provides a highly convenient map display technique.

According to one aspect of the present invention, there is provided an information processing apparatus that composites and displays a map image at a designated scale and an object associated with the map image at the designated scale. The apparatus includes: a first holding unit that holds, for each object, a map image at a scale associated with the object and position information regarding a position at which the object is displayed on the map image, in association with each other; a second holding unit that, for each piece of position information, records an input state of the position information, and holds the recorded input state and the position information in association with each other; and a display unit that composites and displays an object held by the first holding unit in association with position information whose input state satisfies a predetermined condition and a map image at a scale that has a smaller scale ratio and shows a larger area than a map image at the scale associated with the object by the first holding unit.

According to another aspect of the present invention, there is provided an information processing method for compositing and displaying a map image at a designated scale and an object associated with the map image at the designated scale. The method includes: a first holding step of holding, for each object, a map image at a scale associated with the object and position information regarding a position at which the object is displayed on the map image, in association with each other in a first memory; a second holding step of, for each piece of position information, recording an input state of the position information, and holding the recorded input state and the position information in association with each other in a second memory; and a display step of compositing and displaying an object held by the first memory in association with position information whose input state satisfies a predetermined condition and a map image at a scale that has a smaller scale ratio and shows a larger area than a map image at the scale associated with the object by the first memory.

According to still another aspect of the present invention, there is provided an information processing apparatus that provides a map image in accordance with a request given via a network. The apparatus includes: a first holding unit that holds, for each object, a map image at a scale associated with the object and position information regarding a position at which the object is displayed on the map image, in association with each other; and a second holding unit that, for each piece of position information, acquires an input state of the position information via the network, and holds the acquired input state and the position information in association with each other. The first holding unit holds an object held by the first holding unit in association with position information whose input state satisfies a predetermined condition, in association with a map image at a scale that shows a larger area than the map image at the scale associated with the object by the first holding unit.

According to yet another aspect of the present invention, there is provided an information processing method for providing a map image in accordance with a request given via a network. The method includes: a first holding step of holding, for each object, a map image at a scale associated with the object and position information regarding a position at which the object is displayed on the map image, in association with each other in a first memory; and a second holding step of, for each piece of position information, acquiring an input state of the position information via the network, and holding the acquired input state and the position information in association with each other in a second memory. In the first holding step, an object held by the first memory in association with position information whose input state satisfies a predetermined condition is held in association with a map image at a scale that shows a larger area than the map image at the scale associated with the object by the first memory.

According to still yet another aspect of the present invention, there is provided an information processing apparatus that composites and displays a map image at a designated scale and an object associated with the map image at the designated scale. The apparatus includes: a first holding unit that holds, for each object, a map image at a scale associated with the object and position information regarding a position at which the object is displayed on the map image, in association with each other; a second holding unit that, for each piece of position information, records an input state of the position information, and holds the recorded input state and the position information in association with each other; a third holding unit that holds, for each object, an object in a corresponding position on each map image at a different scale as a link object; and a display unit that composites and displays in a highlighted manner, among link objects of objects held by the first holding unit in association with position information whose input state satisfies a predetermined condition, an object associated with a map image that has a smaller scale ratio and shows a larger area than the map image at the scale associated with the object by the first holding unit.

According to yet still another aspect of the present invention, there is provided an information processing apparatus that composites and displays an object associated with a map at a designated scale, on the map at the designated scale. The apparatus includes: a managing unit that counts up the number of times of designation with respect to a position on the map every time the position is designated, and manages the number of times of designation in association with the position and the map; a specifying unit that, if the number of times of designation with respect to a position of interest on the map exceeds a threshold value, specifies a position managed by the managing unit in association with a large-area map that has a smaller scale than the designated scale and includes an area shown by the map, and with the number of times of designation that is larger than the threshold value; and a display unit that selects one of all positions specified by the specifying unit, registers an object at the selected position on the map as a target object on the map, and highlights the target object on the map.

According to still yet another aspect of the present invention, there is provided an information processing method for compositing and displaying a map image at a designated scale and an object associated with the map image at the designated scale. The method includes: a first holding step of holding, for each object, a map image at a scale associated with the object and position information regarding a position at which the object is displayed on the map image, in association with each other; a second holding step of, for each piece of position information, recording an input state of the position information, and holding the recorded input state and the position information in association with each other; a third holding step of holding, for each object, an object in a corresponding position on each map image at a different scale as a link object; and a display step of compositing and displaying in a highlighted manner, among link objects of objects held in the first holding step in association with position information whose input state satisfies a predetermined condition, an object associated with a map image that has a smaller scale ratio and shows a larger area than the map image at the scale associated with the object in the first holding step.

According to yet still another aspect of the present invention, there is provided an information processing method for compositing and displaying an object associated with a map at a designated scale, on the map at the designated scale. The method includes: a managing step of counting up the number of times of designation with respect to a position on the map every time the position is designated, and managing the number of times of designation in association with the position and the map; a specifying step of, if the number of times of designation with respect to a position of interest on the map exceeds a threshold value, specifying a position managed in the managing step in association with a large-area map that has a smaller scale than the designated scale and includes an area shown by the map, and with the number of times of designation that is larger than the threshold value; and a display step of selecting one of all positions specified in the specifying step, registering an object at the selected position on the map as a target object on the map, and highlighting the target object on the map.

Further features of the present invention will become apparent from the following description of exemplary embodiments with reference to the attached drawings.

BRIEF DESCRIPTION OF THE DRAWINGS

FIG. 3 is a diagram showing an exemplary configuration of map image data;

FIG. 4 is a diagram showing an exemplary configuration of object data;

FIG. 5 is a diagram showing an exemplary configuration of display scale data;

FIG. 6 is a diagram showing an exemplary configuration of additional position information;

FIG. 10 is a diagram showing an exemplary configuration of a computer;

FIG. 11A is a diagram showing an exemplary configuration of additional position information;

FIG. 11B is a diagram showing an exemplary configuration of display scale data;

FIG. 12 is a diagram showing an exemplary configuration of display scale data;

FIG. 13 is a flowchart showing the details of processing in step S708;

FIG. 14A is a diagram showing exemplary map display;

FIG. 14B is a diagram showing exemplary map display;

FIG. 16 is a diagram showing an exemplary configuration of additional position information;

FIG. 17 is a diagram showing an exemplary configuration of inter-object link information;

FIG. 28 is a block diagram showing exemplary functional configurations of information processing apparatuses.

DESCRIPTION OF THE EMBODIMENTS

Embodiments of the present invention will be hereinafter described with reference to the accompanying drawings. Note that each embodiment described below indicates one example of the present invention when it is implemented specifically, and is one of the specific examples of the configurations recited in the scope of claims.

First Embodiment

Figure 1:
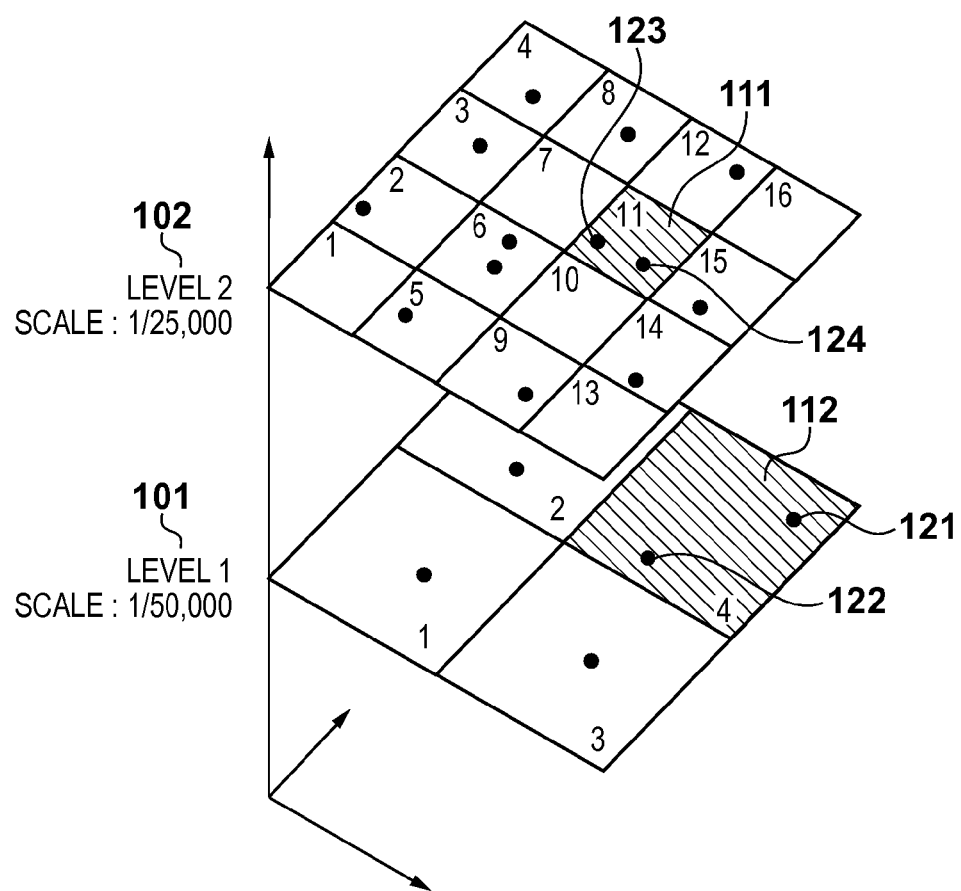
FIG. 1 is a diagram illustrating maps and map display processing.

First, a summary of maps and map display processing used in the present embodiment will be described. In the present embodiment, as shown in FIG. 1, an entire map area is divided into small square areas (hereinafter referred to as "tiles"), and data is managed in units of the tiles. The size of each tile (the length of one side) corresponds to the scale of the maps, and the length of one side increases twofold if the scale is reduced by half. The tiles are managed by scale, and have a structure in which they are layered in the order of scale. Here, for the sake of simplification of description, it is assumed that the maps consist of two levels, namely a level 1 (101) corresponding to a large-area map (scale: 1/50000) and a level 2 (102) corresponding to a detailed map (scale: 1/25000), and that the scale of the level 2 is half the scale of the level 1. A unique ID is allocated to each level: for example, a level ID "1" is allocated to the level 1, and a level ID "2" is allocated to the level 2. Each tile is allocated an ID that is unique within the same level. Here, it is assumed that integer values that monotonically increase from the upper left to the lower right in the map area are simply allocated. In FIG. 1, the entire map area is divided into 4 tiles at the level 1 and into 16 tiles at the level 2, and the IDs 1 to 4 and the IDs 1 to 16 are allocated respectively to these tiles. The shaded portions (111, 112) in FIG. 1 indicate map images. One map image is allocated to one tile, and each map image has the same position and size as those of the corresponding tile.

Figure 27:
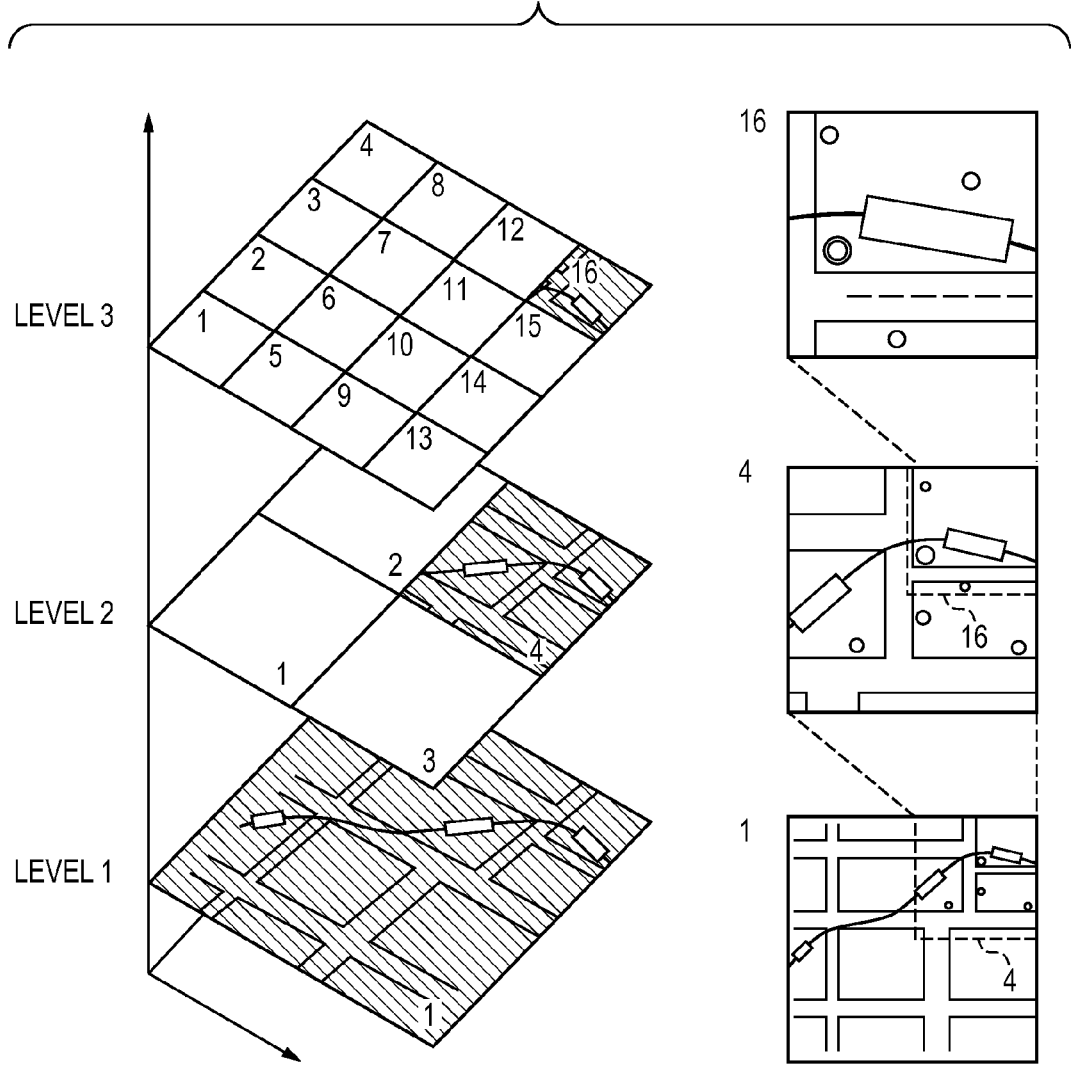
FIG. 27 is a diagram illustrating maps and map display processing.

FIG. 27 shows a relationship between a displayed map image and a tile. At a higher level, a narrower area on the map is enlarged and more detailed information is displayed. In FIG. 27, a level 3 corresponds to a detailed map and a large scale, and a level 1 corresponds to a large-area map and a small scale. In FIG. 1, on the contrary, the level 2 corresponds to a large-area map and a small scale, and the level 1 corresponds to a detailed map and a large scale.

In FIG. 1, black dots (in the shaded portions, black dots 121 to 124) indicate objects. The objects are also managed in association with the tiles. For example, an object 121 is associated with the tile 4 at the level 1, and an object 123 is associated with the tile 11 at the level 2.

Next, a basic operation of map display will be discussed. First, a scale and a display range of the map to be displayed are designated by user input. Generally, in a map display system, the scale and the display range are changed by operating a GUI (graphical user interface). Here, for the sake of simplification of description, it is assumed that the display range of the map coincides with the boundary of a tile, and that the level and the tile are determined from the scale and the display range that are designated by the user at a user interface level. After the tile to be displayed is determined, next, a map image (112) associated with this tile is acquired and displayed. Subsequently, objects (121, 122) associated with the tile are acquired, a display position of each object is calculated, and the objects are displayed so as to be superposed on the map image. The above processing is performed every time the user changes the scale or the display range of the map. The above is the summary description of the map display processing in the present embodiment. Based on the above, a detailed description will be given of the present embodiment below. First, an exemplary functional configuration of an information processing apparatus according to the present embodiment will be described using the block diagram of FIG. 2.

A display managing unit 201, upon receiving an input instruction for designating the scale and the display range of the map to be displayed via a user interface or the like, gives an instruction to elements that will be described below, thereby acquiring, from these elements, the map image and the objects corresponding to the input instruction. As described in the above summary, the map images are managed in association with the tiles at each level in the present embodiment, and therefore the input instruction includes the level ID of the level corresponding to the scale of the map to be displayed and the tile ID of the tile corresponding to the display range. The display managing unit 201 then displays the acquired map image and objects on a display device, such as a CRT or a liquid-crystal screen, that is connected directly or indirectly to the information processing apparatus.

A map image data managing unit 202 acquires, from a storage device 205, the map image at the level and in the display range that are to be displayed in accordance with the instruction from the display managing unit 201, and transmits the acquired map image to the display managing unit 201.

An object managing unit 203 acquires, from the storage device 205, the objects corresponding to the level and the display range that are to be displayed in accordance with the instruction from the display managing unit 201, and transmits the acquired objects to the display managing unit 201. The object managing unit 203 also controls the level at which the objects are displayed, based on information acquired from an additional position information managing unit 204.

In the present embodiment, the additional position information managing unit 204 manages information including position information (an event occurrence position) with which a position on the map can be specified and the number of times that this position information has been acquired so far, as additional position information (data including the position information and the number of times).

The storage device 205 is a memory for storing and managing the map images, objects, additional position information, display scale data which will be described later, and so on. Note that the storage device 205 may be provided directly or indirectly outside the information processing apparatus.

Figure 2:
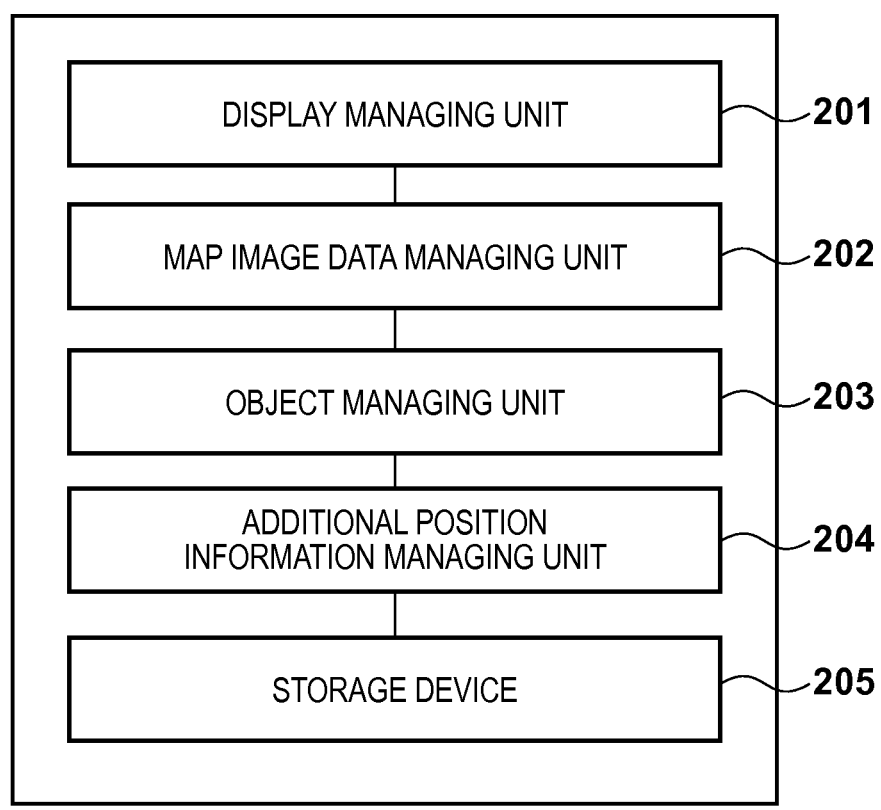
FIG. 2 is a block diagram showing an exemplary functional configuration of an information processing apparatus.

Note that FIG. 2 shows only the main configuration that will appear in the following description. Therefore, although the aforementioned user interface and display device are not shown in FIG. 2, various devices including these devices are connected to this information processing apparatus.

Next, an exemplary configuration of data on the map images (map image data) will be described using FIG. 3. Map image data 301 includes data on a map image itself (image data body) 305 and a group of information pieces 302 to 304 that represent display conditions of this map image.

A level ID 302 represents an ID of the level at which the image data body 305 is displayed. A tile ID 303 represents an ID of the tile corresponding to the image data body 305. Tile coordinates 304 represent an upper left position (x1, y1) and a lower right position (x2, y2) of the image data body 305 in the entire map area. In the present embodiment, it is assumed that the positions are represented by latitude (x1, x2) and longitude (y1, y2). In the storage device 205, the map image data 301 having the above-described configuration is stored for various levels and various tiles.

Next, an exemplary configuration of data on an object (object data) will be discussed using FIG. 4. Object data 401 includes data on an object itself (actual object data) 406 and a group of information pieces 402 to 405 that indicate display conditions of this object.

An object ID 402 represents an ID unique to the object data 401 (actual object data 406). A level ID 403 represents an ID of the level at which the map to be composited with the actual object data 406 is displayed. A tile ID 404 represents an ID of the tile corresponding to the map to be composited with the actual object data 406. Object coordinates 405 represents a composition position of the actual object data 406. In the present embodiment, the composition position represents latitude (x) and longitude (y), and the position on the map can be specified if the latitude and longitude are known. Note that if the object is a place name, the coordinates thereof are those at the upper left of the first character, for example. Note that although a range of latitudes and longitudes can also be used to express the object position, the object here is handled as point data for the sake of simplification. As mentioned above, the actual object data 406 is data on the object itself, and is assumed to be text data representing the name of the object in the present embodiment. The object data 401 having the above-described configuration is stored in the storage device 205.

Next, an exemplary configuration of the display scale data will be discussed using FIG. 5. The display scale data is information for representing the scale and the tile of the map on which the object is composited, and is information in units of the objects.

Display scale data 501 shown in FIG. 5 is generated for a certain object, and an object ID 502 represents an ID of this object. A display level ID 503 represents an ID of the level at which the map to be composited with this object (the object with the object ID 502) is displayed. A tile ID 504 represents an ID of the tile corresponding to the map to be composited with the object (the object with the object ID 502).

Next, an exemplary configuration of the additional position information will be discussed using FIG. 6. In the additional position information 601, event occurrence coordinates 602 represents a position at which an event has occurred. In the present embodiment, latitude (x) and longitude (y) are used as the event occurrence coordinates 602. For the event occurrence coordinates as well, point data is used for the sake of simplification of description. The event occurrence number 603 represents the number of times that the event has occurred at the event occurrence coordinates 602.

Figure 7:
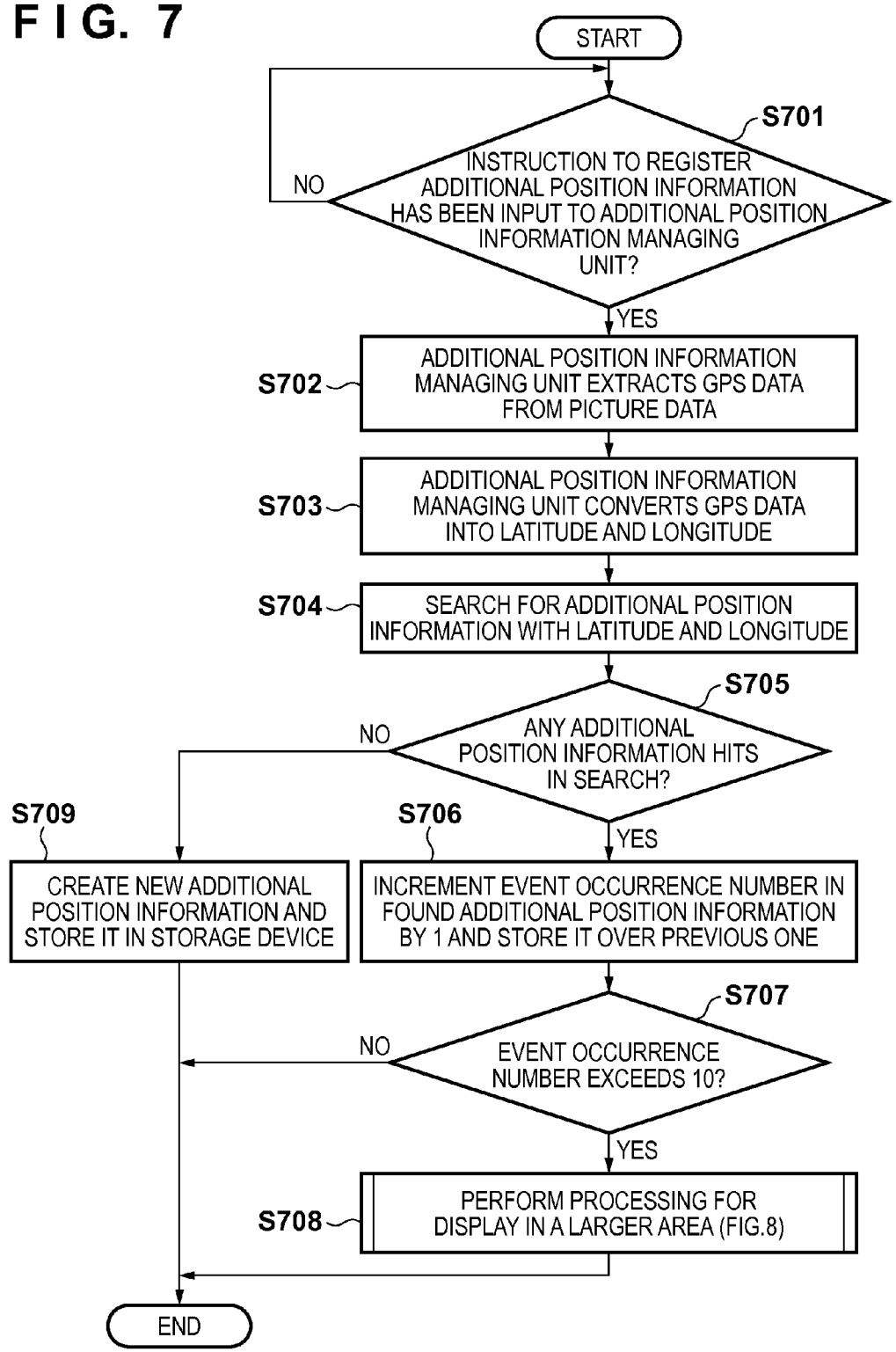
FIG. 7 is a flowchart of processing performed by the information processing apparatus.

Next, processing performed by the information processing apparatus in the case where the input information including the position information with which a position on the map can be specified is input to the information processing apparatus via the user interface or a network will be discussed using the flowchart of FIG. 7.

Here, a description will be given of the case where data regarding a picture taken at a certain latitude and longitude is input to the information processing apparatus, as an example of input of the input information. In this case, the input information input to the information processing apparatus includes the picture and an imaging position (GPS data) measured by the device that took this picture.

In step S701, the additional position information managing unit 204 determines whether or not such input information has been input (i.e., whether or not an instruction to register the additional position information has been input). As a result of the determination, if it has been input, processing proceeds to step S702, and if not, processing waits at step S701. In step S702, the additional position information managing unit 204 extracts the GPS data, which is the information on the position at which the picture was taken, from the input information that was input.

In step S703, the additional position information managing unit 204 calculates the latitude and longitude based on the GPS data extracted in step S702. If data that directly represents the latitude and longitude is included, in place of the GPS data, in the input information, of course that data may be used as it is.

In step S704, the additional position information managing unit 204 searches in the storage device 205 for the additional position information including the latitude and longitude obtained in step S703 as the event occurrence coordinates. As a result of the search, if the additional position information including the latitude and longitude obtained in step S703 as the event occurrence coordinates is found, processing proceeds to step S706 via step S705, and if not, processing proceeds to step S709 via step S705.

In step S706, the additional position information managing unit 204 updates the event occurrence number in the additional position information found in the search in step S704 by incrementing the event occurrence number by 1. Thus, every time the input information including the position information for specifying the position on the map is input, the number of times that this position information has been input is counted up, and it is thereby possible to manage the counted up number of times of input and the position information in association with each other (second management).

In step S707, the additional position information managing unit 204 determines whether or not the event occurrence number that was incremented in step S706 exceeds a predetermined value (e.g., 10). As a result of the determination, if the event occurrence number exceeds the predetermined value, processing proceeds to step S708, and if not, processing according to the flowchart of FIG. 7 is ended.

In step S708, the additional position information managing unit 204 lowers the display level of the object whose object coordinates are the latitude and longitude obtained in step S703 by 1, thereby causing this object to be displayed also on a larger-area map. The details of processing in step S708 will be described later.

On the other hand, in step S709, the additional position information managing unit 204 generates the additional position information in which the event occurrence coordinates and the event occurrence number are initialized to "the latitude and longitude obtained in step S703" and "1", respectively, and stores the generated additional position information in the storage device 205. Further, in step S709, the additional position information managing unit 204 may extract a picture from the input information and register the extracted picture in the storage device 205. The extracted picture may be, for example, displayed so as to be composited on the map corresponding to the position information in the input information.

Here, in the present embodiment the levels of the scale of the map are limited to two levels for the sake of simplification of description, but if there are three or more levels, the display scale data may be updated twice or more. As a method for processing this, a method is available in which a step of reverting the event occurrence number in the additional position information to 0 is added between processing in step S707 and processing in step S708 described above, for example. Thus, if the event occurrence number exceeds the predetermined value again, step S708 is invoked so that the display scale data can be updated.

Figure 8:
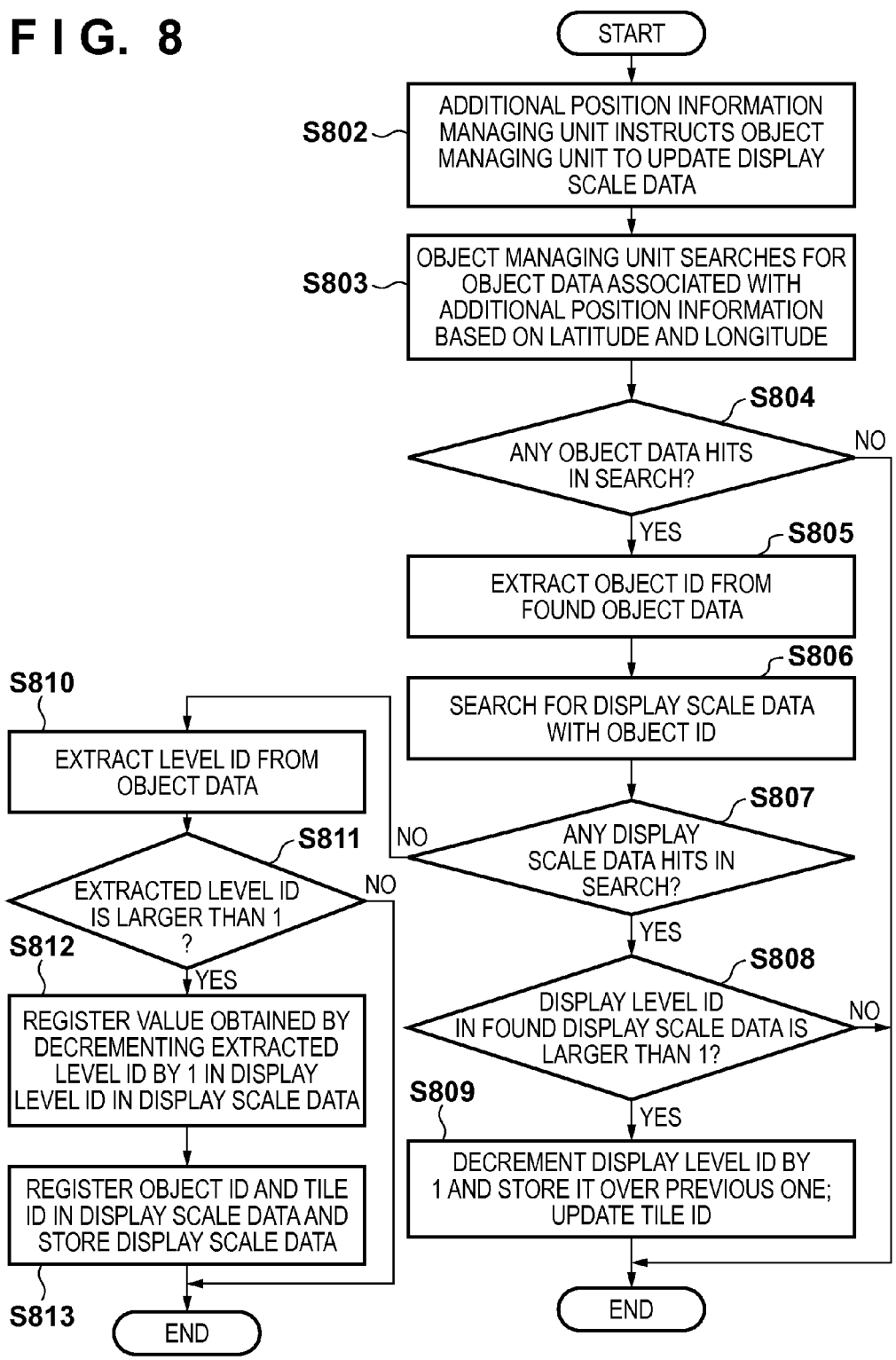
FIG. 8 is a flowchart showing the details of processing in step S708.

Next, the details of processing in step S708 will be described using the flowchart of FIG. 8. In step S802, the additional position information managing unit 204 instructs the object managing unit 203 to update the display scale data.

In step S803, the object managing unit 203, upon receiving the display scale data update instruction, searches in the storage device 205 for the object data including the same coordinates (object coordinates) as the event occurrence coordinates in the additional position information found in the search in step S704. Because, as mentioned above, both the object and the additional position information are handled as point data in the present embodiment, object data including the completely matched latitude and longitude can be acquired in this search.

As a result of this search, if the object data is found that includes the same coordinates as the event occurrence coordinates in the additional position information found in the search in step S704, processing proceeds to step S805 via step S804. On the other hand, if not, processing is ended via step S804.

In step S805, the object managing unit 203 extracts the object ID from the object data found in the search in step S803. In step S806, the object managing unit 203 searches in the storage device 205 for the display scale data including the same ID as the object ID extracted in step S805. As a result of this search, if the display scale data including the same ID as the object ID extracted in step S805 is found, processing proceeds to step S808 via step S807. On the other hand, if not, processing proceeds to step S810 via step S807.

In step S808, the object managing unit 203 determines whether or not the display level ID in the display scale data found in the search in step S806 is larger than 1. As a result of the determination, if the display level ID is larger than 1, processing proceeds to step S809, and if the display level ID is 1, processing is ended.

In step S809, the object managing unit 203 updates the display level ID in the display scale data found in the search in step S806 by decrementing the display level ID by 1, and also updates the tile ID in the display scale data to the tile ID specified by processing that will be described later.

On the other hand, in step S810, the object managing unit 203 extracts the level ID from the object data found in the search in step S803. In step S811, the object managing unit 203 determines whether or not the level ID extracted in step S810 is larger than 1. As a result of the determination, if the level ID is larger than 1, processing proceeds to step S812, and if the level ID is 1, processing is ended.

In step S812, the object managing unit 203 causes the level ID that was decremented by 1 from the level ID extracted in step S810 to be included as the display level ID in new display scale data.

In step S813, the object managing unit 203 causes the object ID extracted in step S805 and the tile ID specified by processing that will be described later to be included in the new display scale data. Then, the object managing unit 203 stores the new display scale data in the storage device 205.

Here, a description will be given of the method for specifying the tile ID updated in step S809 and tile ID included in the new display scale data in step S813.

The tile ID registered in the display scale data after the level ID is changed should not be the tile ID in the object data found in the search in step S803, but rather the ID of the tile that is at the level with the updated level ID and includes the tile coordinates of the tile with the tile ID in the found object data. For example, in FIG. 1, among the tiles at the level 1, the tile including the tile coordinates of the tile with the tile ID=13 at the level 2 is the tile with the tile ID=3. It can be specified by determining which of the tile coordinates of the tiles at the level 1 include the tile coordinates of the tile with the tile ID=13 at the level 2.

Of course this specifying method is not limited to a specific one, and various methods are conceivable. For example, in the present embodiment, the correspondence relationship between the tile IDs at two adjoining levels is fixed, and the tile ID to be associated at the level after being changed is uniquely defined by the tile ID associated at the level before being changed, as shown in FIG. 1. Accordingly, the tile ID after being changed that is uniquely defined by the tile ID extracted from the object data is registered in the display scale data.

Figure 9:
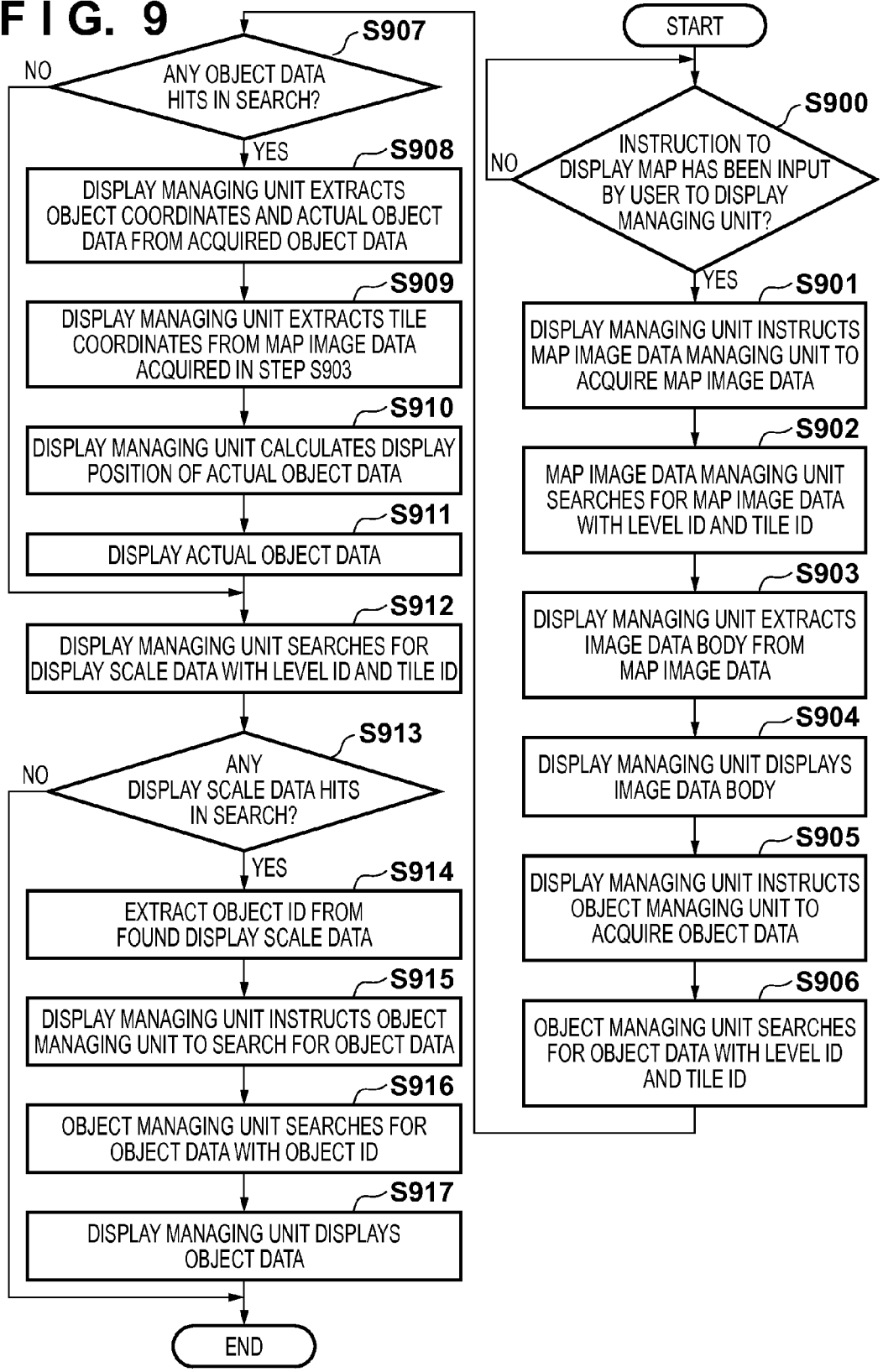
FIG. 9 is a flowchart of processing performed by the information processing apparatus.

Next, processing performed by the information processing apparatus to display the map corresponding to the scale and the display range that are designated via the interface or the network will be discussed using FIG. 9 showing the flowchart of this processing.

In step S900, the display managing unit 201 determines whether or not a map display instruction has been input via the user interface or the network. As a result of the determination, if the display instruction has been input, processing proceeds to step S901, and if not, processing waits at step S900.

As described above, this display instruction includes the level ID and the tile ID. Therefore, in step S901, the display managing unit 201 instructs the map image data managing unit 202 to acquire the map by transmitting the level ID and the tile ID included in the display instruction to the map image data managing unit 202.

In step S902, the map image data managing unit 202 searches in the storage device 205 for the map image data including the level ID and the tile ID received from the display managing unit 201. Then, the map image data managing unit 202 transmits the map image data that was found to the display managing unit 201.

In step S903, the display managing unit 201 extracts the image data body, that is, the map image itself from the map image data received from the map image data managing unit 202. In step S904, the display managing unit 201 displays the map based on the extracted image data body on the aforementioned display device.

In step S905, the display managing unit 201 instructs the object managing unit 203 to acquire the object by transmitting the level ID and the tile ID included in the display instruction to the object managing unit 203.

In step S906, the object managing unit 203 searches in the storage device 205 for the object data including the level ID and the tile ID received from the display managing unit 201. As a result of the search, if the object data including the level ID and the tile ID received from the display managing unit 201 is found, processing proceeds to step S908 via step S907. On the other hand, if not, processing proceeds to step S912 via step S907.

In step S908, the object managing unit 203 transmits the object data that was found to the display managing unit 201. Then, the display managing unit 201 extracts the object coordinates and the actual object data from the object data received from the object managing unit 203.

In step S909, the display managing unit 201 extracts the tile coordinates from the map image data received from the map image data managing unit 202. In step S910, the display managing unit 201 obtains the display position (composition position) of the object on the map displayed in step S904 from the tile coordinates extracted in step S909 and the object coordinates extracted in step S908. The latitude and longitude of the four corners of the map can be found based on the tile coordinates, and those of the object can be found based on the object coordinates. The relative position of the object relative to the four corners of the map can be found based on those latitudes and longitudes, and this relative position can be used as the composition position. In step S911, the object based on the actual object data extracted in step S908 is displayed at the composition position obtained in step S910.

With the above-described processing, the object that is originally associated with the tile at the designated level is displayed. Next, processing proceeds to that for displaying the object whose display level has been changed.

In step S912, the display managing unit 201 searches in the storage device 205 for the display scale data including the level ID and the tile ID included in the display instruction. As a result of the search, if the display scale data including the level ID and the tile ID included in the display instruction is found, processing proceeds to step S914 via step S913, and if not, processing is ended via step S913.

In step S914, the display managing unit 201 extracts the object ID from the display scale data found in the search in step S912. In step S915, the display managing unit 201 instructs the object managing unit 203 to search for the object data by transmitting the object ID extracted in step S914 to the object managing unit 203.

In step S916, the object managing unit 203 searches in the storage device 205 for the object data including the object ID received from the display managing unit 201. Then, the object managing unit 203 transmits the object data found in the search to the display managing unit 201.

In step S917, the display managing unit 201 performs processing in steps S908 to S911 above for the object data received from the object managing unit 203, thereby displaying the object based on the actual object data in the object data.

Here, because the object data is managed independently for each level in the present embodiment, the object data at the changed level can possibly be the same as that of the original object. Such an object has been found in the search in step S906 by the above-described processing, and is displayed first. Accordingly, when the display position is calculated in processing in step S917, the object data does not have to be displayed if the object data already exists at the same display position.

FIGS. 14A and 14B show examples of map display in the present embodiment. FIG. 14A shows a state before the level ID is changed, and FIG. 14B shows a state after the level ID is changed. In these examples, the scale at which "Todoroki Valley Park" is displayed has been changed to the large-area map, and therefore, Todoroki Valley Park is displayed only on the map after being changed.

As described above, according to the present embodiment, event information concerning the position such as a place where a picture was taken is input, and the scale at which an object related to this position is displayed can be changed to the large-area map. It is thereby possible to achieve an effect of easily finding a desired place name quickly when event information is searched for on the map by using the place name as a reference.

As described above, in the case where the object associated with the map at the designated scale is displayed so as to be composited on the map at this scale, the present invention achieves the above-described effect as a result of employing the following configuration.

For each object, the map to be composited with the object and the composition position information for specifying the composition position of the object on this map are managed in association with each other (first management).

Every time the input information including the position information for specifying the position on the map is input, the number of times that this position information has been input is counted up, and the counted up number of times of input and the position information are managed in association with each other (second management).

If the counted up number of times of input exceeds a predetermined value, among the managed objects, an object associated with the composition position information representing the same position as that of the position information managed in association with the number of times of input is set to be a target object. Then, the target object is managed in association with the map at a smaller scale than the scale of the map associated with the target object (third management).

The map at the designated scale is set to be a designated scale map, and the objects managed under the first management and the third management in association with the designated scale map are displayed so as to be composited on the designated scale map.

Therefore, the configurations described in the present and subsequent embodiments may be modified/varied in any ways as long as the modified/varied configurations result in the above-described configuration, and various examples of modification/variation are conceivable.

Second Embodiment

In the present embodiment, the aforementioned input information includes identification information for identifying the user as well as the position information with which a position on the map can be specified. Processing performed by the information processing apparatus when such input information is input to the information processing apparatus is different from processing of the flowcharts of FIGS. 7 and 8 described in the first embodiment, on the following point.

In step S702, the additional position information managing unit 204 extracts the GPS data, which is the information on the position at which a picture was taken, and the identification information for identifying the user who took the picture from the input information that has been input. As this identification information, model information of the camera that took the picture is used. In the present embodiment, the camera model information is used as the identification information, assuming that every user uses a different camera, but any information with which the user can be identified can be used as the identification information.

In step S704, the additional position information managing unit 204 searches in the storage device 205 for the additional position information that includes the latitude and longitude obtained in step S703 as the event occurrence coordinates, and also includes the identification information extracted in step S702 as an event execution user, which will be described later.

In the present embodiment, the additional position information includes the identification information for identifying the user who has executed the event, in addition to the configuration shown in FIG. 6. The exemplary configuration of the additional position information used in the present embodiment is shown in FIG. 11A. In FIG. 11A, the same items as those in FIG. 6 are provided with the same reference numbers, and will not be described. An event execution user 1104 represents the camera model information serving as the identification information.

Note that the predetermined value used in step S707 may be changed for each user. In step S709, further, the identification information extracted in step S702 is registered in the additional position information and stored in the storage device 205.

Step S708 is different from that in the first embodiment on the following point. In step S806, the object managing unit 203 searches in the storage device 205 for the display scale data that includes the same ID as the object ID extracted in step S805, and that also includes the identification information extracted in step S702 as a user identifier, which will be described later.

In the present embodiment, the display scale data includes the user identifier for identifying the user who executed the event, in addition to the configuration shown in FIG. 5. An exemplary configuration of the display scale data used in the present embodiment is shown in FIG. 11B. In FIG. 11B, the same items as those in FIG. 5 are provided with the same reference numbers, and will not be described. A user identifier 1105 represents the camera model information serving as the identification information.

In step S813, the identification information extracted in step S702 is also registered in the display scale data and stored in the storage device 205.

Next, processing performed by the information processing apparatus to display the map corresponding to the scale and the display range that are designated via the interface or the network is different from that in the first embodiment on the following point.

In step S912, the display scale data including a designated user identifier in addition to the level ID and the tile ID included in the display instruction is searched for in the storage device 205. The user identifier may be, for example, a user identifier designated via the user interface or the network, and the method for designation thereof is not limited to a specific designation method.

As described above, according to the present embodiment, it is possible to control update of the display scale data for each user as a result of the additional position information holding the identification information for identifying the user. By applying this method, for example, a configuration is possible in which the name of a place in a picture obtained from others, rather than that in a picture taken by the user, is preferentially displayed on the large-area map.

Third Embodiment

In the first embodiment, the case where the number of levels of the scale is limited to two and the display scale data is updated only once was described. In the present embodiment, assuming the case where a configuration in which there are three or more levels is employed and the display scale data is updated twice or more, a method is described in which a difference between the level with which an object is originally associated and the level after being changed is used in the update of the display scale data. Note that only differences from the first embodiment will hereinafter be described, and other aspects are assumed to be the same as the first embodiment unless stated otherwise.

An exemplary configuration of the display scale data according to the present embodiment is shown in FIG. 12. In FIG. 12, the same items as those in FIG. 5 are provided with the same reference numbers, and will not be described. An update counter 1205 indicates the number of times that the information in the display scale data 1201 has been updated, and the initial value thereof is 1.

Next, processing performed in step S708 will be described using FIG. 13 that shows the flowchart of this processing. In FIG. 13, the same processing steps as those in FIG. 8 are provided with the same step numbers, and will not be described.

In step S1309, the object managing unit 203 extracts the level ID from the object data found in the search in step S803. In step S1310, the object managing unit 203 obtains a difference D between the level ID extracted in step S1309 and the display level ID in the display scale data found in the search in step S806.

In step S1311, the object managing unit 203 determines whether or not the following expression is satisfied, using a value C of the update counter in the display scale data found in the search in step S806, the aforementioned difference D, and a predetermined threshold value N.

$$N^{(D+1)} \leq C \times N$$

If the expression is satisfied, it is determined that the display level ID in the display scale data found in the search in step S806 is to be updated, and processing proceeds to step S1312. On the other hand, if not, it is determined that the display level ID in the display scale data found in the search in step S806 is not to be updated, and processing proceeds to step S1313.

In step S1312, the object managing unit 203 updates the display level ID in the display scale data found in the search in step S806 by decrementing the display level ID by 1, and also updates the update counter by incrementing the update counter by 1.

On the other hand, in step S1313, the object managing unit 203 updates the update counter in the display scale data found in the search in step S806 by incrementing the update counter by 1. In step S1314, the object managing unit 203 updates the event occurrence number in the additional position information found in the search in step S704 to 0.

According to the present embodiment, with the map having three or more levels, the display level ID is less likely to change as the number of times that the display level of the object has been changed increases, that is, as the gap between the original display level and the display level after being changed increases. For this reason, in the present embodiment, it is determined whether or not to perform the current association, in accordance with the difference between the scale of the map that was associated last time and the originally associated scale of the map. Therefore, as long as this nature can be reflected, the expression used in the determination in step S1311 is not limited to the above expression, and other expressions or other methods may alternatively be used.

By applying this method, it is possible to suppress excessive occurrence of update of the display scale data resulting from a large number of pictures being accumulated in a service in which many users share pictures, for example. It is thereby possible to prevent a deficiency such as the display of the names of very minor landmarks on a whole-country map.

Fourth Embodiment

In the above embodiments, the object whose display scale data has been updated is not distinguished from the object displayed at its original display level when these objects are displayed, while in the present embodiment, these objects are displayed so that they can be visibly distinguished. Hereinafter, only differences from the first embodiment will be described, and other aspects are assumed to be the same as the first embodiment unless stated otherwise.

To distinguish display of the objects, that is, to display the objects in different display modes, for example, a method is available in which, in step S917, the actual object data regarding the object whose display scale data has been updated is manipulated before the object is displayed.

If the actual object data is text data as in the first embodiment, a method of changing the font, character size, or character color is conceivable. In the case where icons or picture thumbnails are used as the actual object data, a method can be used in which a plurality of sets of actual object data are prepared for various scales and the actual object data to be used is changed in accordance with the scale after being changed.

As described above, according to the present embodiment, not only the name or icon of a place in which the user is interested is displayed on the large-area map, but also it can be highlighted, resulting in improvement of searchability.

Fifth Embodiment

In the third embodiment, a method of changing the display scale data a plurality of times on the map having a plurality of scales has been described. In the present embodiment, in addition thereto, the number of times of update of the additional position information associated with the object whose display scale data has been changed is summed, and the method for displaying the object is changed in accordance with the result.

In the present embodiment, an update counter 1205 shown in FIG. 12 is used as a summation result of the number of times that the additional position information has been updated. In step S917, the additional position information associated with the object data is acquired, and the update counter is extracted from the additional position information. Lastly, the method for displaying the actual object data is changed in accordance with the value of the update counter. For example, it is possible to use a method of changing the icon size in accordance with the magnitude of the update counter value, a method of writing the update counter value together with the actual object data, and the like.

According to the present embodiment, for example, a configuration is possible in which the object associated with a large number of pictures is highlighted, resulting in improvement of searchability. Particularly, the effect is achieved in the case of searching for pictures in a service in which a plurality of users share pictures.

Sixth Embodiment

The above embodiments have been described assuming that the object whose display scale data has been changed is always displayed. Here, the number of objects associated with the large-scale map is generally larger than the number of objects associated with the small-scale map, and therefore, there is a possibility that even if the display scale data is changed, a blank space in which objects can be displayed does not exist on the map after being changed. Further, if two adjacent objects on the large-scale map are displayed on the small-scale map, they are possibly overlapped because of a lack of resolution.

In the present embodiment, when the object whose display scale data has been changed is displayed, it is determined whether or not an overlap of display of the actual object data has occurred on the map after being changed, and if an overlap has occurred, the display position of the actual object data is changed so as to eliminate the overlap. As a method for implementing this, for example, a method for avoiding overlap in existing text layout techniques can be used if text is used as the actual object data.

Of course setting criteria for displaying/not displaying the object whose display scale data has been changed are not limited thereto, and other setting criteria are also conceivable. For example, if the objects are managed by type, the number of objects to be displayed is set for each type, and thus less than the upper limit number of objects are displayed for each type.

Further, whether the object whose display scale data has been changed is to be displayed/not displayed may be set during processing as described above, or the user may designate whether to display/not display the object via the interface or the network.

According to the present embodiment, even if the number of objects to be displayed on the large-area map is increased, it is possible to avoid overlap of display of place names or the like, and to improve searchability without losing readability of the map.

Seventh Embodiment

In the above embodiments, it is assumed that no particular processing is performed if the object data associated with the additional position information does not exist. In the present embodiment, if the object data associated with the additional position information does not exist, the object data associated with the position indicated by this additional position information is newly registered. At this time, the actual object data to be set in the object data can be acquired from the additional position information, or input by the user. Note that various configurations therefor are conceivable.

Eighth Embodiment

In the above embodiments, the object and the additional position information have been described as point data, but are not limited thereto. For example, if area data is used, matching determination may be performed when associating the object and the additional position information, based on a relationship, such as overlap or inclusion, between areas of the object and of the additional position information. Existing techniques can be used for the area matching determination.

Ninth Embodiment

In the above embodiments, it is assumed that the level to be displayed is changed only for the object whose display scale data has been changed. In the present embodiment, in conjunction with the change in the display scale data regarding one object, display of other objects is changed.

First, in the present embodiment, the object data holds category information that indicates a category of the object, in addition to the configuration of FIG. 4. When the object whose display scale data has been changed is displayed, the objects of the same category that are associated with the same level as the original display level of the object whose display scale data has been changed are also displayed together.

By applying the present embodiment, for example, if a picture of a historical site is obtained and the display scale of the place name thereof is changed, the place names of other nearby historical sites are also preferentially displayed on the large-area map. In other words, an application is possible in which places that the user is likely to be interested in are recommended.

Note that the technical content described in the above embodiments may be combined as appropriate. Regarding the parts of the above embodiments to be combined and how to combine these parts, various combinations are conceivable.

Tenth Embodiment

Subsequently, a tenth embodiment will be discussed. The present embodiment relates to a method in which, if the user has performed a search on the map, an object relevant to a search target is displayed preferentially on the large-area map.

Figure 15:
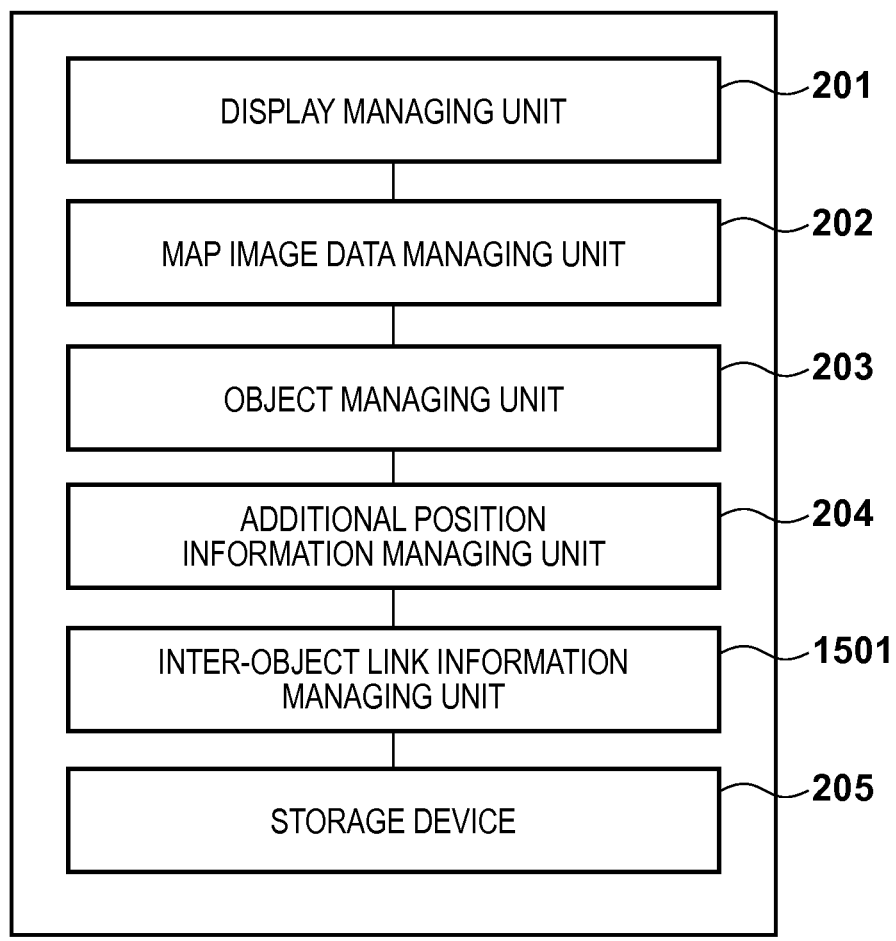
FIG. 15 is a block diagram showing an exemplary functional configuration of an information processing apparatus.

FIG. 15 shows an exemplary functional configuration of the information processing apparatus according to the present embodiment. An inter-object link information managing unit 1505 manages inter-object link information for association between the object associated with the additional position information and other objects relevant to this object. The details of the inter-object link information will be described later.

Next, an exemplary configuration of the additional position information will be discussed using FIG. 16. In the additional position information 1601, event occurrence coordinates 1602 represent a position at which an event has occurred. In the present embodiment, latitude (x) and longitude (y) are used as the event occurrence coordinates 1602. Point data is used also for the event occurrence coordinates for the sake of simplification of description. An event occurrence number 1603 represents the number of times that the event has occurred at the event occurrence coordinates 1602. An associated object ID 1604 is an object ID in the object data having object coordinates 1602 that are closest to the event occurrence coordinates 1602 among the object data stored in the storage device 205. A tile ID 1605 is a tile ID in the object data having the object coordinates that are closest to the event occurrence coordinates 1602 among the object data stored in the storage device 205. A level ID 1606 is a level ID in the object data having the object coordinates that are closest to the event occurrence coordinates 1602 among the object data stored in the storage device 205. The additional position information 1601 having the above-described configuration is stored in the storage device 205.

Next, an exemplary configuration of the inter-object link information will be discussed using FIG. 17. A link source object ID 1702 is an object ID of the object (link source object) associated with the additional position information. A link target object ID 1703 is an object ID of the object (link target object) relevant to the object having the link source object ID 1702. A link target level ID 1704 is the level ID in the object data regarding the link target object. A link target tile ID 1705 is the tile ID in the object data regarding the link target object. The inter-object link information 1701 having the above-described configuration is stored in the storage device 205.

Next, processing performed by the information processing apparatus in the case where the input information including the position information with which a position on the map can be specified is input to the information processing apparatus via the user interface or the network will be discussed using the flowchart of FIG. 18.

Here, the case will be described where data regarding a picture taken at certain latitude and longitude is input, as an example of input of the input information, to the information processing apparatus. In this case, the input information input to the information processing apparatus includes the picture and an imaging position (GPS data) measured by the device that took this picture.

In step S1801, the additional position information managing unit 204 determines whether or not such input information has been input (i.e., whether or not an instruction to register the additional position information has been input). As a result of the determination, if it has been input, processing proceeds to step S1802, and if not, processing waits at step S1801. In step S1802, the additional position information managing unit 204 extracts the GPS data, which is the information on the position at which the picture was taken, from the input information that was input.

In step S1803, the additional position information managing unit 204 calculates the latitude and longitude based on the GPS data extracted in step S1802. If data that directly represents the latitude and longitude is included, in place of the GPS data, in the input information, of course that data may be used as it is.

In step S1804, the additional position information managing unit 204 searches in the storage device 205 for the additional position information that includes the latitude and longitude obtained in step S1803 as the event occurrence coordinates. As a result of the search, if the additional position information that includes the latitude and longitude obtained in step S1803 as the event occurrence coordinates is found, processing proceeds to step S1806 via step S1805, and if not, processing proceeds to step S1809 via step S1805.

In step S1806, the additional position information managing unit 204 updates the event occurrence number in the additional position information found in the search in step S1804 by incrementing the event occurrence number by 1. Thus, every time the input information including the position information for specifying a position on the map is input, the number of times that this position information has been input is counted up, and it is thereby possible to manage the counted up number of times of input and the position information in association with each other. Note that the associated object ID, the tile ID, and the level ID are also registered in this additional position information, as described above. Therefore, this management is also management in which every time an object that is displayed so as to be composited on the map is designated, the number of times of designation with respect to this object is counted up, and this number of times of designation is managed in association with the map.

In step S1807, the additional position information managing unit 204 determines whether or not the event occurrence number that was incremented in step S1806 exceeds a predetermined value (e.g., 10). As a result of the determination, if the event occurrence number exceeds the predetermined value, processing proceeds to step S1808, and if not, processing according to the flowchart of FIG. 18 is ended. The details of processing in step S1808 will be described later.

On the other hand, in step S1809, the additional position information managing unit 204 searches in the storage device 205 for the object data that includes the latitude and longitude obtained in step S1803 as the object coordinates. As a result of the search, if the object data including the latitude and longitude obtained in step S1803 as the object coordinates is found, processing proceeds to step S1811 via step S1810, and if not, processing is ended via step S1810.

In step S1811, the additional position information managing unit 204 generates the additional position information in which the event occurrence coordinates and the event occurrence number are initialized to "the latitude and longitude obtained in step S1803" and "1", respectively. Further, the additional position information managing unit 204 initializes the associated object ID, the tile ID, and the level ID in this additional position information to the object ID, the tile ID, and the level ID in the object data that was found in step S1809, respectively. Then, the additional position information managing unit 204 stores the additional position information that has been thus generated in the storage device 205.

Further, in step S1811, the additional position information managing unit 204 may extract the picture from the input information and register the extracted picture in the storage device 205. The extracted picture may be, for example, displayed so as to be composited on the map corresponding to the position information in the input information.

Figure 18:
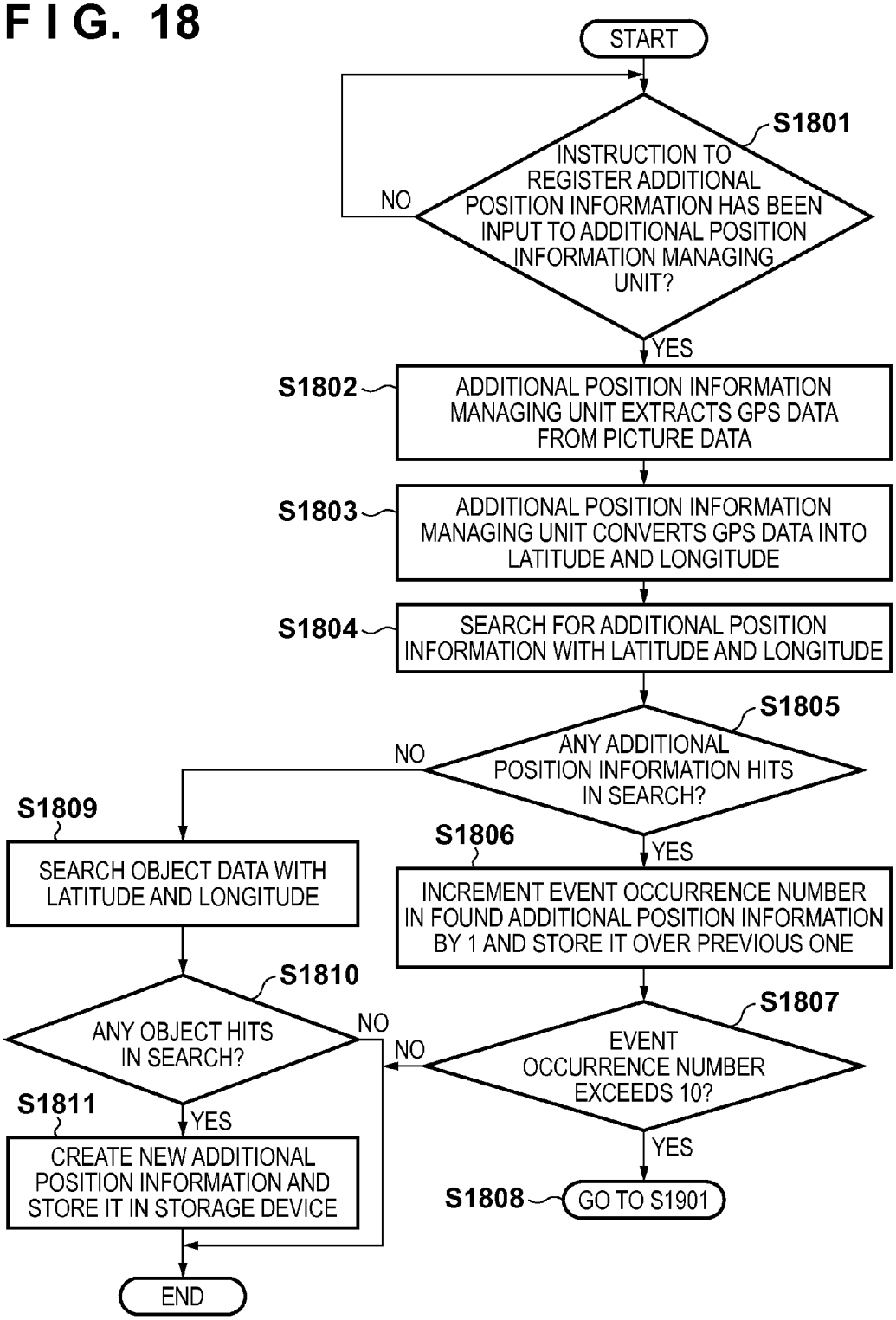
FIG. 18 is a flowchart of processing performed by the information processing apparatus.

Note that processing according to the flowchart of FIG. 18 is ended if the object data that includes the longitude and latitude obtained in step S1803 as the object coordinates is not found in the storage device 205. However, if the object data that includes the longitude and latitude obtained in step S1803 as the object coordinates is not found, the object data that includes the object coordinates that are closest to the longitude and latitude obtained in step S1803 may be used as the search result.

Figure 19:
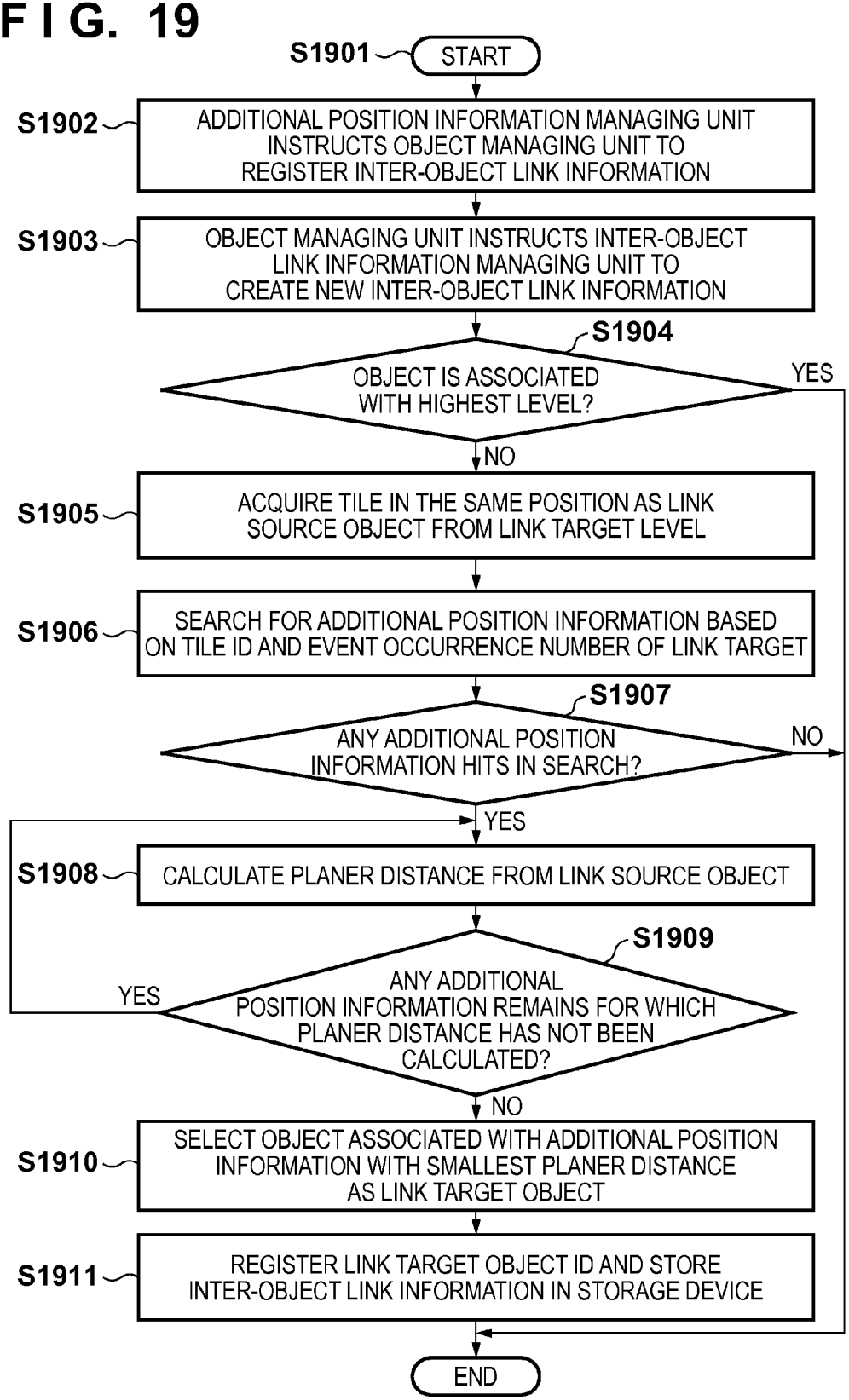
FIG. 19 is a flowchart showing the details of processing in step S1808.

Next, processing in step S1808 mentioned above will be described using FIG. 19 that shows the flowchart of this processing.

In step S1902, the additional position information managing unit 204 instructs the object managing unit 203 to register the inter-object link information. In step S1903, the object managing unit 203 instructs the inter-object link information managing unit 1505 to create new inter-object link information.

In step S1904, the inter-object link information managing unit 1505 determines whether or not the level ID in the additional position information whose event occurrence number (which exceeds the predetermined value) was incremented in step S1806 is the level ID of the largest-area map. Hereafter, this additional position information will be referred to as "target additional position information".

As a result of the determination, if the level ID in the target additional position information is the level ID of the map of the largest area, processing is ended, and if not, processing proceeds to step S1905.

In the present embodiment, for the sake of simplification of description, it is assumed that the number of levels of the map is two, and that the level ID=1 is the ID of the level of the largest-area map and the level ID=2 is the ID of the level of the second largest-area map. Therefore, if the level ID in the target additional position information is "1", processing is ended, and if the level ID is "2", processing proceeds to step S1905.

In step S1905, the inter-object link information managing unit 1505 specifies the tile ID of a tile that overlaps with the tile with the tile ID in the target additional position information, from among the tiles at the level with a smaller level ID than the level ID in the target additional position information.

For example, in FIG. 1, among the tiles at the level 1, the tile that overlaps with the tile with the tile ID=13 at the level 2 is the tile with the tile ID=3. It can be specified by determining which of the tile coordinates of the tiles at the level 1 includes the tile coordinates of the tile with the tile ID=13 at the level 2.

Of course this specifying method is not limited to a specific one, and various methods are conceivable. For example, in the present embodiment, the correspondence relationship of the tile IDs between the two adjoining levels is fixed as shown in FIG. 1, and a tile at the level 1 that overlaps with a tile at the level 2 is uniquely determined.

In step S1906, the inter-object link information managing unit 1505 searches in the storage device 205 for the additional position information that has the tile ID specified in step S1905 and whose event occurrence number exceeds a predetermined value (e.g., 5).

In other words, with the processing in steps S1905 and S1906, the additional position information is searched for that has a smaller level ID than the level ID in the target additional position information, the tile ID of the tile that overlaps with the tile with the tile ID in the target additional position information, and the event occurrence number that exceeds the predetermined value.

As a result of the search, if the additional position information is found, processing proceeds to step S1908 via step S1907, and if not, processing is ended via step S1907.

In step S1908, the inter-object link information managing unit 1505 selects unselected one among plural pieces of the additional position information that was found in the search in step S1906. Then, the inter-object link information managing unit 1505 obtains a distance between the event occurrence coordinates in the selected additional position information and the event occurrence coordinates in the target additional position information.

In step S1909, the inter-object link information managing unit 1505 determines whether or not an unselected piece among plural pieces of the additional position information that was found in the search in step S1906 remains. As a result of the determination, if an unselected piece of the additional position information remains, processing returns to step S1908, and if not, processing proceeds to step S1910.

In step S1910, the associated object ID in the additional position information including the event occurrence coordinates whose distance obtained in step S1908 is smallest is selected as the link target object ID.

In step S1911, the inter-object link information managing unit 1505 sets the link source object ID and the link target object ID to be the associated object ID in the target additional position information and the associated object ID selected in step S1910, respectively. Further, the inter-object link information managing unit 1505 sets the link target level ID and the link target tile ID to be the level ID and the tile ID, respectively, in the additional position information including the event occurrence coordinates whose distance obtained in step S1908 is smallest. Then, the inter-object link information managing unit 1505 stores, in the storage device 205, the inter-object link information including the above-described link source object ID, link target object ID, link target level ID, and link target tile ID.

Figure 20:
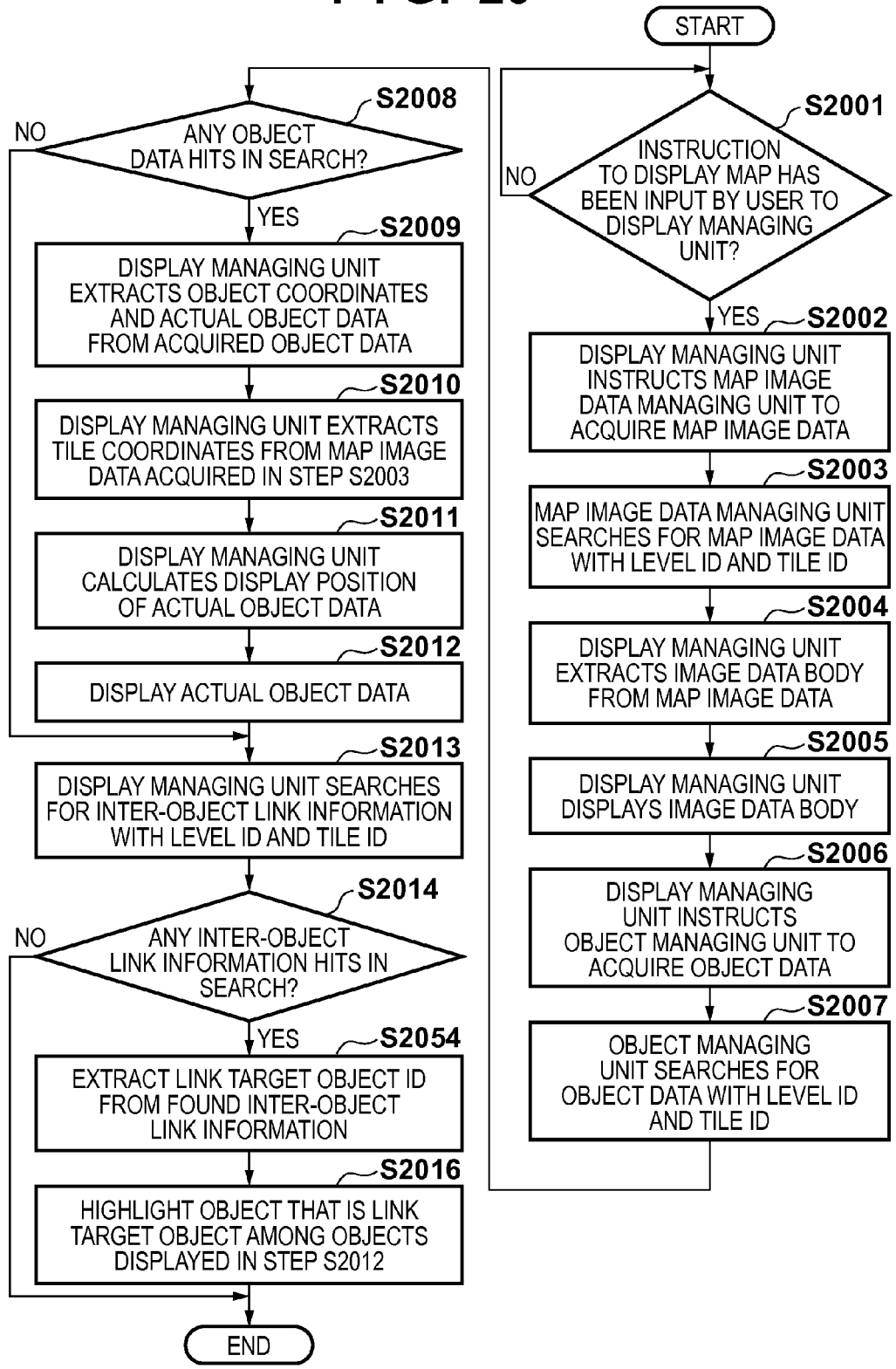
FIG. 20 is a flowchart of processing performed by the information processing apparatus.

Next, processing performed by the information processing apparatus to display the map corresponding to the scale and the display range that are designated via the interface or the network will be discussed using FIG. 20 that shows the flowchart of this processing.

In step S2001, the display managing unit 201 determines whether or not a map display instruction has been input via the user interface or the network. As a result of the determination, if the display instruction has been input, processing proceeds to step S2002, and if not, processing waits at step S2001.

As described above, this display instruction includes the level ID and the tile ID. Therefore, in step S2002, the display managing unit 201 instructs the map image data managing unit 202 to acquire the map by transmitting the level ID and the tile ID included in the display instruction to the map image data managing unit 202.

In step S2003, the map image data managing unit 202 searches in the storage device 205 for the map image data that includes the level ID and the tile ID received from the display managing unit 201. Then, the map image data managing unit 202 transmits the map image data that was found to the display managing unit 201.

In step S2004, the display managing unit 201 extracts the image data body, that is, the map image itself from the map image data received from the map image data managing unit 202. In step S2005, the display managing unit 201 displays the map based on the extracted image data body on the aforementioned display device.

In step S2006, the display managing unit 201 instructs the object managing unit 203 to acquire the object by transmitting the level ID and the tile ID included in the display instruction to the object managing unit 203.

In step S2007, the object managing unit 203 searches in the storage device 205 for the object data including the level ID and the tile ID received from the display managing unit 201. As a result of the search, if the object data including the level ID and the tile ID received from the display managing unit 201 is found, processing proceeds to step S2009 via step S2008. On the other hand, if not, processing proceeds to step S2013 via step S2008.

In step S2009, the object managing unit 203 transmits the object data that was found to the display managing unit 201. Then, the display managing unit 201 extracts the object coordinates and the actual object data from the object data received from the object managing unit 203.

In step S2010, the display managing unit 201 extracts the tile coordinates from the map image data received from the map image data managing unit 202. In step S2011, the display managing unit 201 obtains the display position (composition position) of the object on the map displayed in step S2005 from the tile coordinates extracted in step S2010 and the object coordinates extracted in step S2009. The latitudes and longitudes of the four corners of the map can be found based on the tile coordinates, and those of the object can be found based on the object coordinates. The relative position of the object relative to the four corners of the map can be found based on these latitudes and longitudes, and this relative position can be used as the composition position. In step S2012, the display managing unit 201 displays the object based on the actual object data extracted in step S2009 at the composition position obtained in step S2011.

With the above-described processing, the object that is originally associated with the tile at the designated level is displayed. Next, processing proceeds to that for displaying the object associated with a tile at the level designated in the inter-object link information.

In step S2013, the display managing unit 201 searches in the storage device 205 for the inter-object link information that includes the level ID and the tile ID included in the display instruction as the link target level ID and the link target tile ID, respectively. As a result of the search, if the inter-object link information that includes the level ID and the tile ID included in the display instruction respectively as the link target level ID and the link target tile ID is found, processing proceeds to step S2054 via step S2014. On the other hand, if not, processing is ended via step S2014.

In step S2054, the display managing unit 201 extracts the link target object ID in the inter-object link information found in the search in step S2013. In step S2016, the display managing unit 201 highlights the object having the link target object ID extracted in step S2054, among the objects that are already displayed, as a highlight target object. For example, the highlight target object may be displayed in a color different from that of other objects, or other objects may be normally displayed while the object having the link target object ID extracted in step S2054 may be blinked.

As described above, according to the present embodiment, event information concerning the position, such as a place where a picture was taken, is input, and the object relevant to the object relating to this position can be highlighted. Thereby, when the event information is searched for by using a place name as a reference on the map, it is more likely that the target place name will be quickly found.

Eleventh Embodiment

Figure 21:
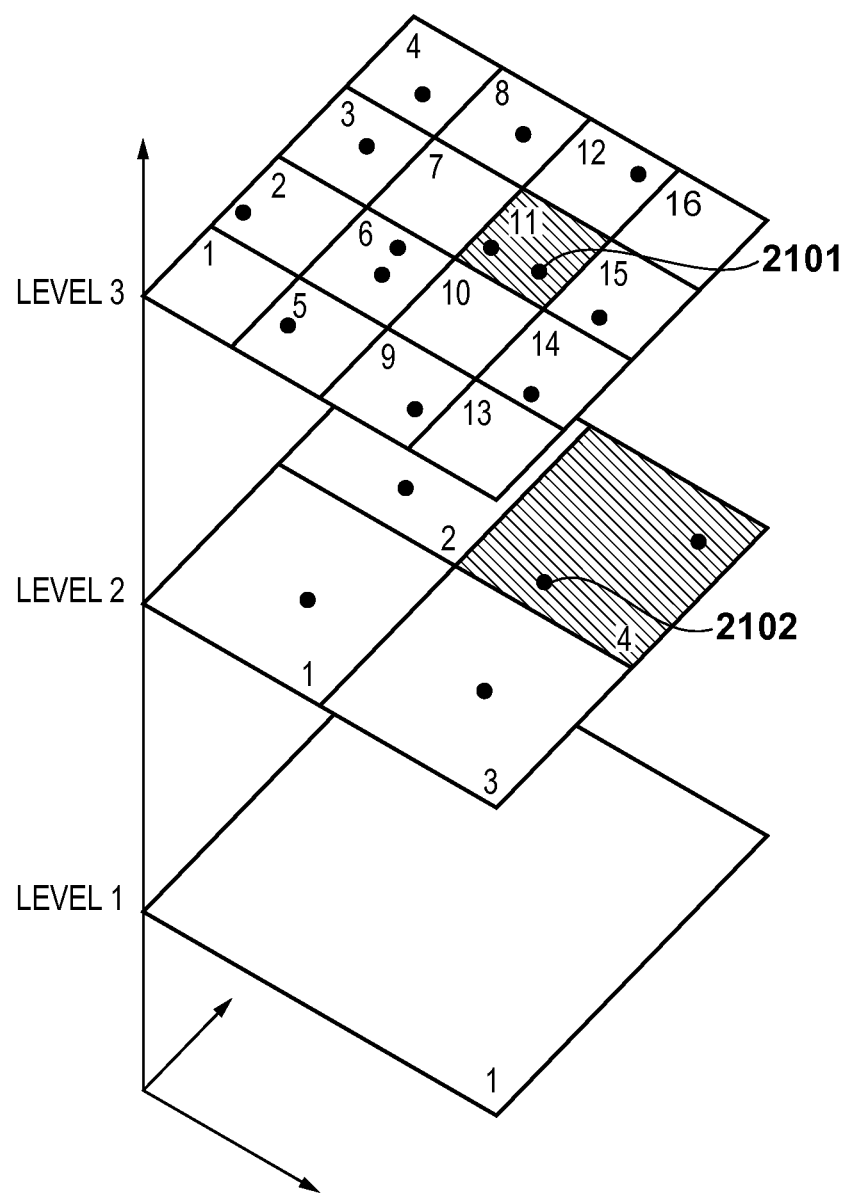
FIG. 21 is a diagram illustrating maps and map display processing.

In the present embodiment, the number of levels, which is two in the tenth embodiment, is three as shown in FIG. 21. In other words, the present embodiment is the same as the tenth embodiment on the point that data is managed in units of tiles at each level. Further, in the present embodiment, the level with the level ID=1 (the scale is smallest) is a large-area map, the level with the level ID=2 (the scale is second smallest) is a middle-area map, and the level with the level ID=3 (the scale is largest) is a detailed map. Other aspects are the same as those in the tenth embodiment.

Figure 22:
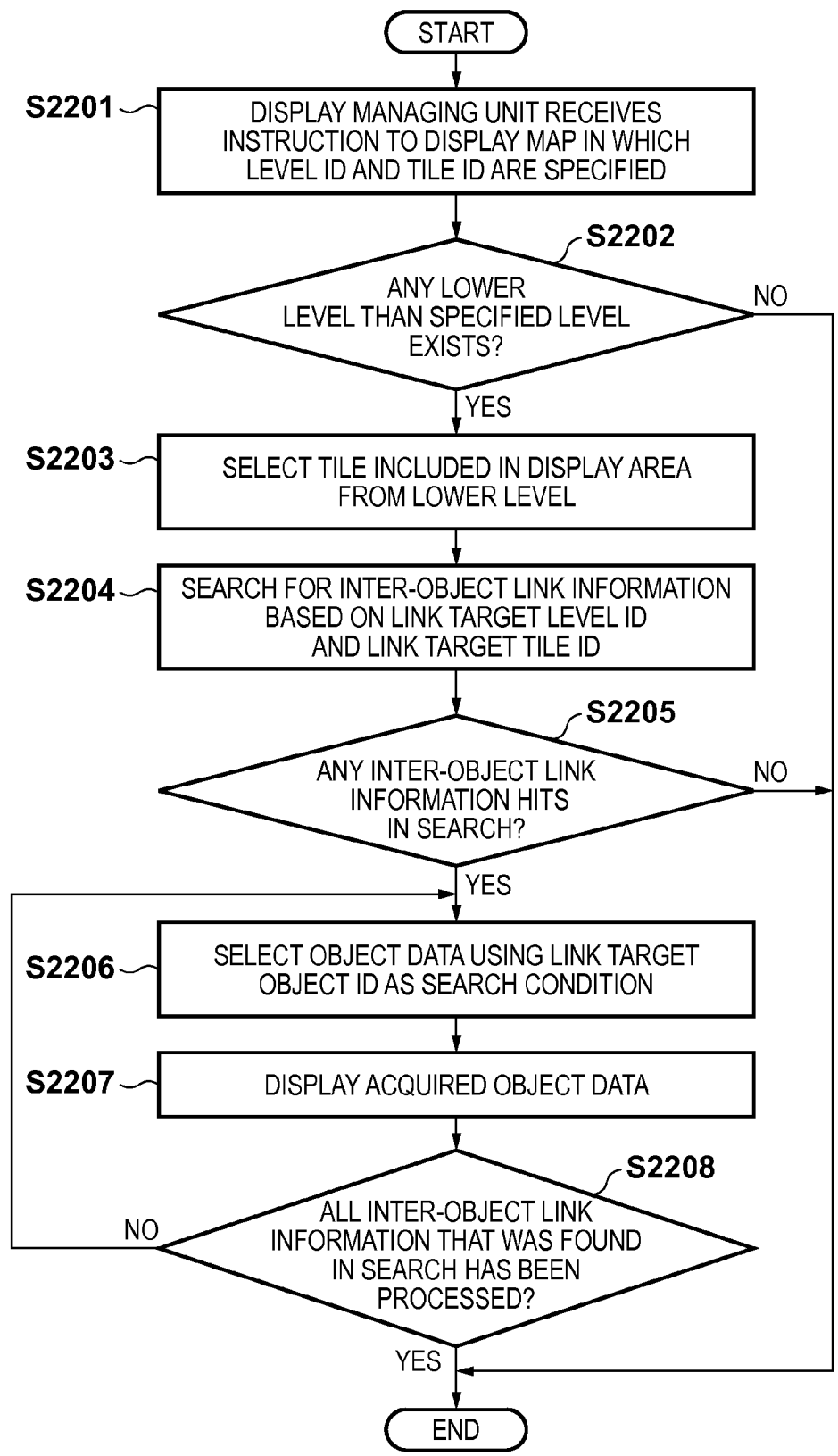
FIG. 22 is a flowchart of processing performed by the information processing apparatus.

Next, processing for displaying the object that is registered as the link target object in the inter-object link information will be discussed with reference to the flowchart of FIG. 22.

It is assumed that the link source object in the inter-object link information used here is an object 2101 that is associated with the detailed map, and the link target object is an object 2102 that is associated with the middle-area map. The level of the map to be displayed is the large-area map. Note that the method for displaying objects other than the link target object conforms to that in the tenth embodiment, and will therefore not be described.

In step S2201, the display managing unit 201, upon receiving an instruction to display a map input via the user interface or the network, displays the map on the aforementioned display device, as in the tenth embodiment. In the following description, it is assumed that both the level ID and the tile ID that are included in this display instruction are "1".

In step S2202, the display managing unit 201 determines whether or not any larger level IDs than the level ID included in the display instruction exist. In the case of FIG. 20, if the level ID=3, a larger level ID than that does not exist. Here, since the level ID=1, it is determined that a larger level ID exists.

As a result of the determination in step S2202, if it is determined that a larger level ID exists, processing proceeds to step S2203, and if not, processing shown in the flowchart of FIG. 12 is ended.

In step S2203, the display managing unit 201 selects the larger level IDs than the level ID included in the display instruction in ascending order of the level ID. Here, the link target object is never associated with the level 3 that is the most detailed because of the data configuration of the inter-object link information. Therefore, if an instruction to display the level 1 is given, the link target object is acquired only from the level 2. When the level ID is selected, among the tiles at the level with the selected level ID, the tile that overlaps with the tile with the level ID=1 and the tile ID=1 is selected, as in the first embodiment.

In step S2204, the display managing unit 201 searches in the storage device 205 for the inter-object link information whose link target level ID and link target tile ID are the level ID selected in step S2203 and the tile ID of the tile selected in step S2203, respectively.

As a result of the search, if the inter-object link information is found, processing proceeds to step S2206 via step S2205, and if not, processing is ended via step S2205.

In step S2206, the display managing unit 201 selects one unselected piece of inter-object link information that was found in step S2204, and extracts the link target object ID from the selected piece of inter-object link information. Then, the display managing unit 201 searches in the storage device 205 for the object data that includes the extracted link target object ID as its object ID.

In step S2207, the display managing unit 201 displays the object based on the actual object data in the object data found in the search in step S2206. The method for displaying the object based on the actual object data is as described in the tenth embodiment.

In step S2208, the display managing unit 201 determines whether or not any unselected piece of inter-object link information remains in the inter-object link information that was found in step S2204. As a result of the determination, if an unselected piece of inter-object link information remains, processing returns to step S2206, and if not, the present processing is ended.

Here, for the sake of simplification of description, the case of using the map data (a set of object data and map image data) configured with three levels has been described. However, if the map data configured with four or more levels is used, the object can be displayed in the same manner by repeating processing in steps S2203 to S2204 for each level. If a plurality of levels exist for which the link target object is acquired, a plurality of link target objects that are associated with different levels possibly exist with respect to one link source object. In this case, a method of displaying all link target objects, a method of displaying only objects with the smallest level ID, or the like may be used.

In the present embodiment, the scale at which the link target object is displayed is changed to the large-area map, and it is thereby possible, when the user searches for an object on the map, to display an object relevant to the search target object on the large-area map. Thus, it becomes easy to find the target object quickly.

Twelfth Embodiment

In the above embodiment, as the criteria for selecting the link target object, the link target object having the smallest planer distance to the link source object is selected. However, various other selection criteria are conceivable.

For example, the similarity to an object name included in the actual object data may be used as the selection criteria. Specifically, the object data having an object name that is similar to that in the actual object data in the object data that has the same object ID as the associated object ID in the target additional position information is specified. The additional position information having the same associated object ID as the object ID in the specified object data is selected from among the additional position information found in the search in step S1906. The associated object ID, the level ID, and the tile ID in the selected additional position information are used as the link target object ID, the link target level ID, and the link target tile ID, respectively. With this method, it is possible to highlight other objects whose names are similar to that of the search target object at a higher level, and efficiency improvement can be expected in the case where search is performed using the name as a clue.

As other selection criteria, map operation history of the user is also available. For example, a method can be used in which the category of an object that is displayed closest to the position specified by the user when enlarging the map display is summed, and an object that belongs to the category with a high frequency is preferentially selected as the link target object. With this method, it is possible to preferentially display the object belonging to the category that is often selected as a clue for specifying a place by the user. Specifically, a configuration is possible in which the name of a station is highlighted for a user who often operates the map using the station name as a clue, and the searchability improvement effect can be expected.

In another example, user information other than the map data may also used together. With this method, for example, a configuration is possible in which, by using shop use history, objects of shops that belong to the same category are preferentially displayed. In still another example, link target object candidates may be presented to the user, and the user may make a selection from among them.

Note that the above tenth to twelfth embodiments are only examples of the following configuration. In other words, all of the information processing apparatuses according to the tenth to twelfth embodiments are an information processing apparatus that composites, on a map at a designated scale, an object associated with the map at this scale, and displays the object and the map. In such an information processing apparatus, the number of times of designation with respect to a position on the above map is counted, and this number of times of designation is managed in association with the position and the map. If the number of times of designation with respect to a position of interest on the map exceeds a threshold value, positions managed in association with the large-area map including the area shown in the above map are specified, and the objects at the specified positions on the large-area map are highlighted on the large-area map.

In this display, in the tenth embodiment, a position closest to the position of interest on the map is selected from among the specified positions, and the object at the selected position is registered as a target object on the above map and this target object is highlighted on the above map.

Further, in this display, in the eleventh embodiment, an object that is registered as the target object on a detailed map that has a larger scale than the above map and is of an area shown in the above map is displayed on the above map.

Further, in this display, in the twelfth embodiment, the position of the object having an object name that is similar to the object name of the object at the position of interest on the above map is selected from among the specified positions. Then, the object at the selected position on the above map is registered as the target object on the above map, and this target object is highlighted on the above map.

Thirteenth Embodiment

In the above embodiments, display of the object is changed using the inter-object link information. In the present embodiment, in a system in which a map display client receives map data from a map data server via a network, the data to be received is optimized using the inter-object link information.

Figure 23:
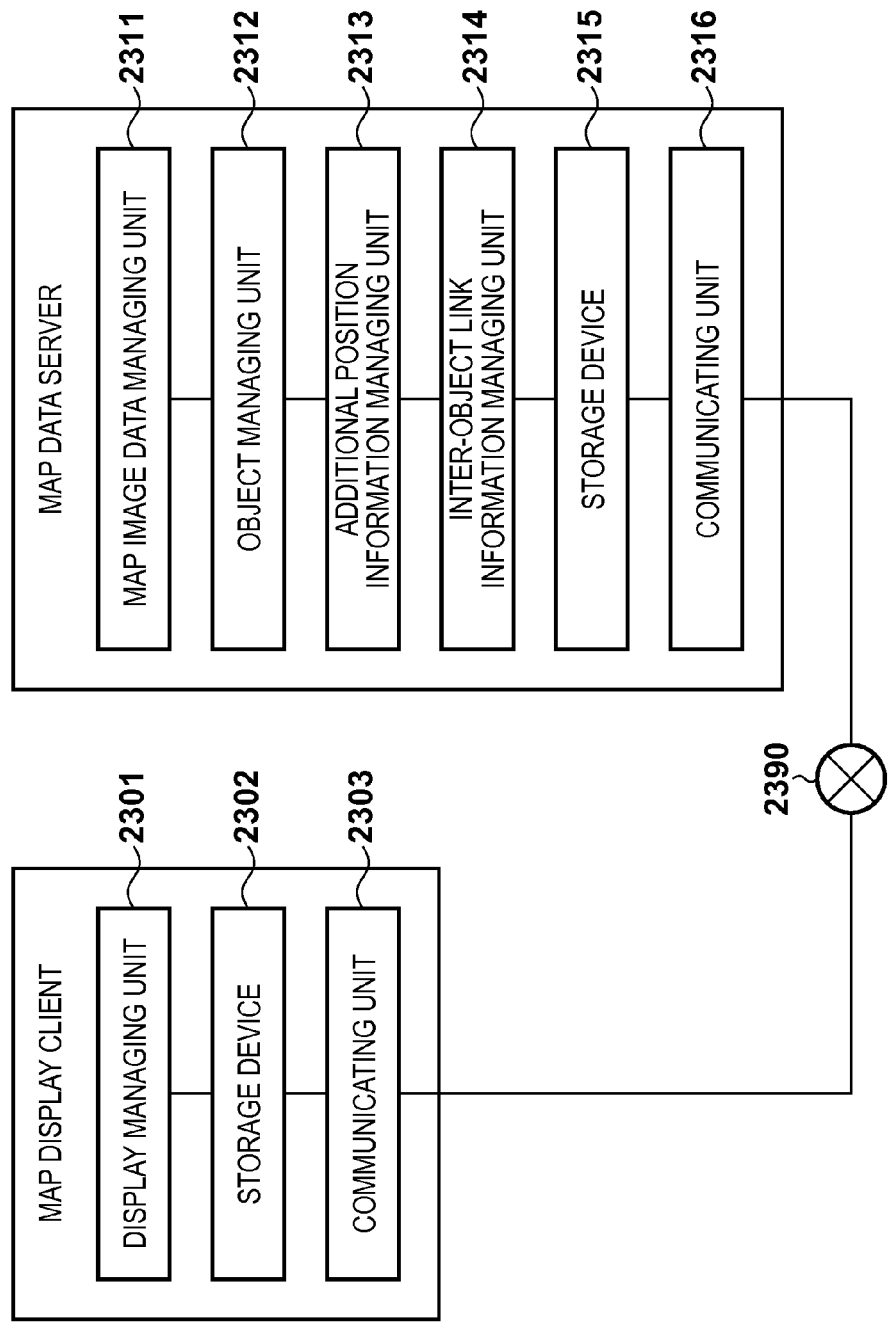
FIG. 23 is a block diagram showing an exemplary functional configuration of a map display system.

An exemplary functional configuration of a map display system according to the present embodiment will be described using the block diagram of FIG. 23. The map display system includes the map display client that requests desired map data from a map data server and displays a map based on the map data supplied in accordance with the request, and the map data server that supplies the map data requested by the map display client. The map display client and the map data server are connected to a wired and/or wireless network 2390, and can perform data communication with each other via the network 2390. The basic operation of functional units included in the map display client and the map data server are as described in the above embodiments, and therefore, only the functions unique to the present embodiment will be hereinafter described.

Figure 24:
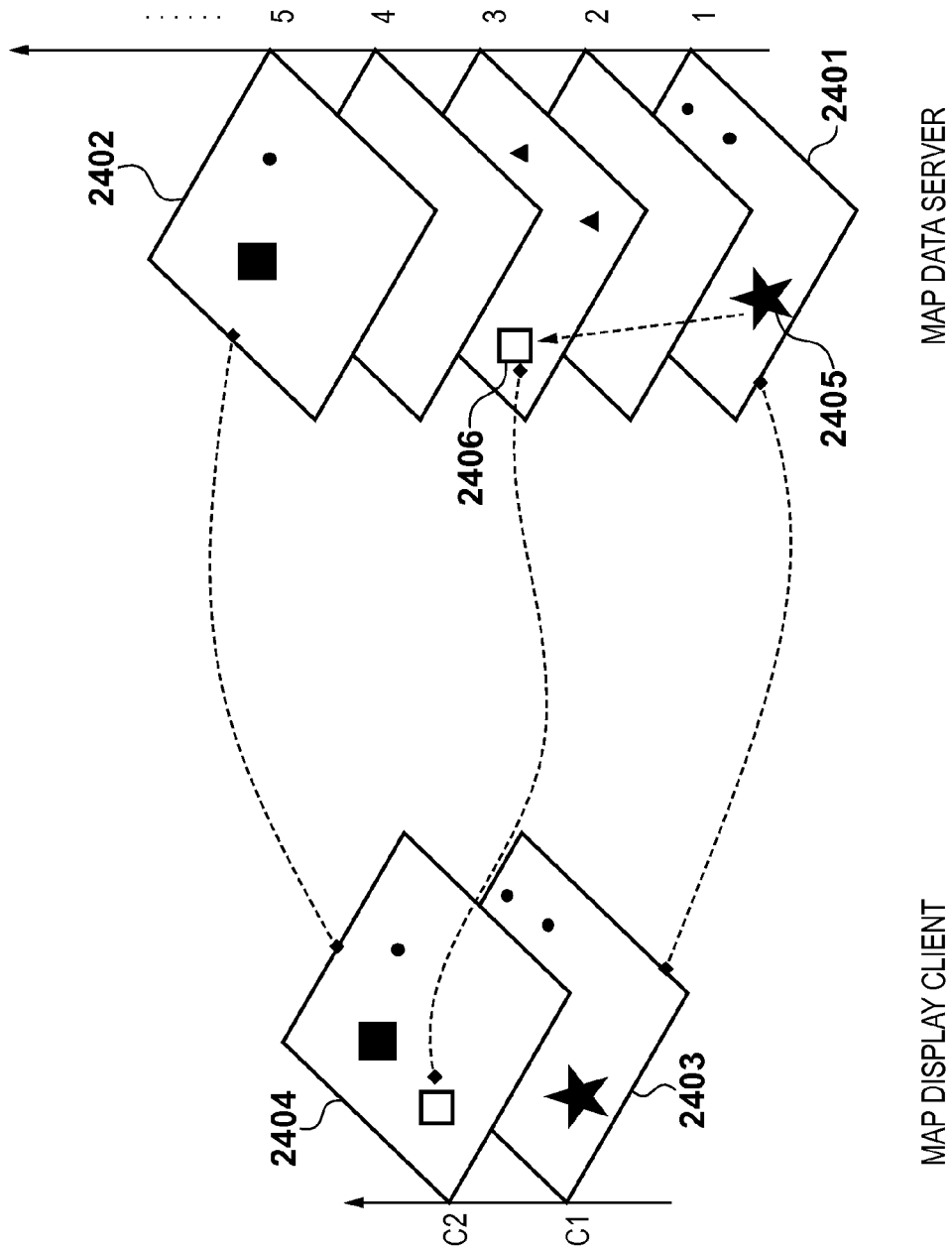
FIG. 24 is a diagram showing a state of data communication.

A state of data communication between the map display client and the map data server will be discussed using FIG. 24. In the present embodiment, the map data server holds map data at multiple levels, and the map display client downloads and uses the map data at a specific level among them. In FIG. 24, the map display client downloads map data 2401 at a level 1 and map data 2402 at a level 5 from the map data server, and acquires them as map data 2403 at a level C1 and map data 2404 at a level C2, respectively.

Further, in the present embodiment, the object registered as the link target object in the inter-object link information is separately downloaded from among the objects associated with levels that are not download targets. In FIG. 24, an object 2406 that is registered as the link target object of an object 2405 associated with the level 1 is separately downloaded, and is displayed at the level C2 on the map display client side.

Figure 25:
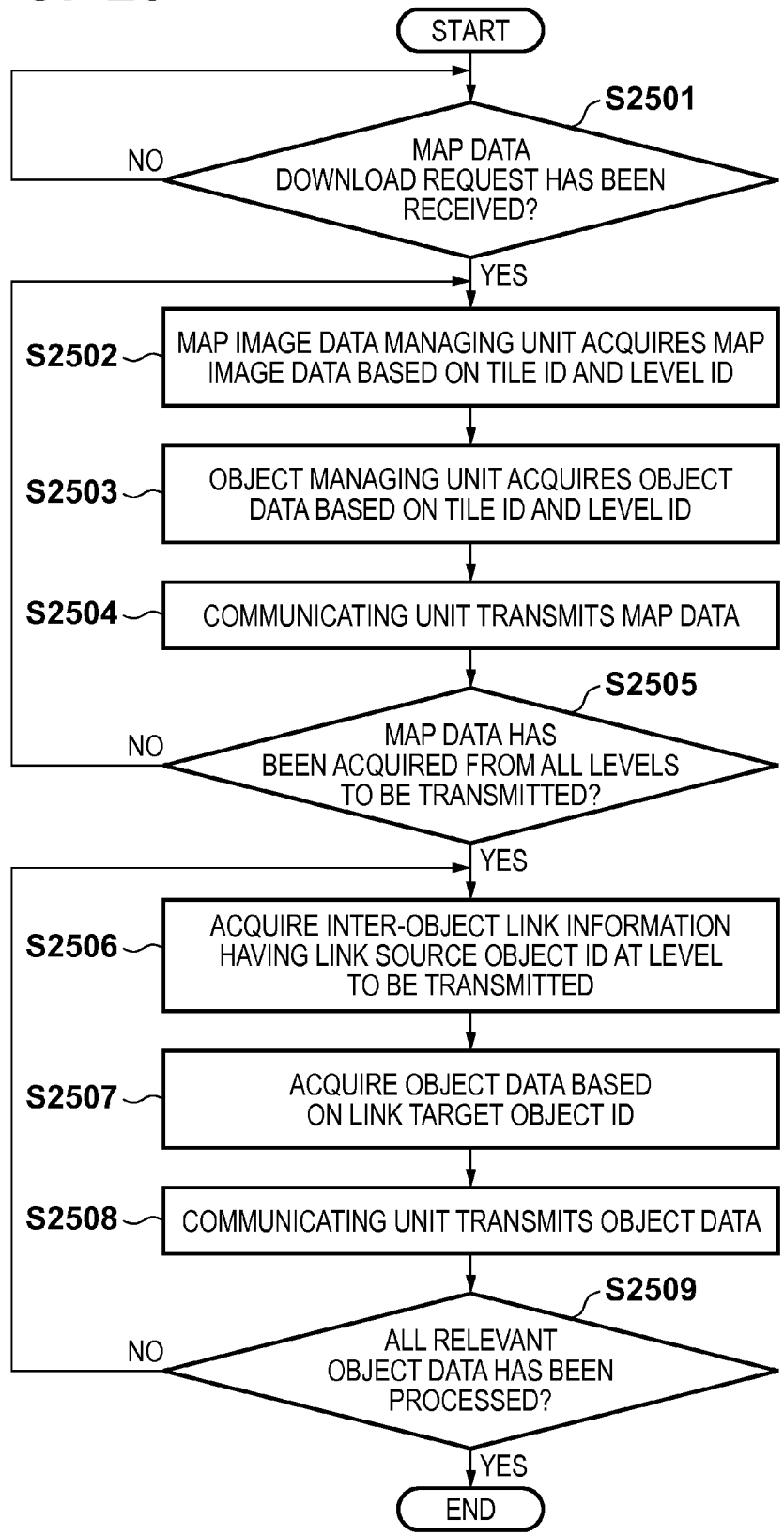
FIG. 25 is a flowchart of processing performed by a map data server.

Next, processing performed by the map data server for transmitting map image data and object data to the map display client in accordance with a request from the map display client will be discussed using FIG. 25 showing the flowchart of this processing.

Upon a communicating unit 2316 receiving a map data transmission request (download request) transmitted from the map display client, processing proceeds to step S2502 via step S2501.

In step S2502, a map image data managing unit 2311 searches in a storage device 2315 for map image data including level IDs and tile IDs included in the transmission request.

In step S2503, an object managing unit 2312 searches in the storage device 2315 for the object data including the level IDs and the tile IDs included in the transmission request.

In step S2504, the communicating unit 2316 transmits, as the map data, a set of the map image data that was found in step S2502 and the object data that was found in step S2503 to the map display client via the network 2390.

In step S2505, the communicating unit 2316 determines whether or not the map image data and the object data for all level IDs included in the transmission request have been transmitted. As a result of the determination, if the map image data and the object data for all level IDs included in the transmission request have been transmitted, processing proceeds to step S2506. On the other hand, if the map image data and the object data have not been transmitted for all level IDs, processing returns to step S2502.

In step S2506, an inter-object link information managing unit 2314 searches in the storage device 2315 for inter-object link information that includes the object IDs in the object data that was found in step S2503 as link source object IDs.

In step S2507, the object managing unit 2312 searches in the storage device 2315 for the object data that includes the link target object IDs in the inter-object link information found in the search in step S2506 as object IDs.

In step S2508, the communicating unit 2316 transmits the object data that was found in step S2507 to the map display client via the network 2390.

In step S2509, the communicating unit 2316 determines whether or not all relevant object data has been transmitted. As a result of the determination, if all relevant object data has been transmitted, the present processing is ended, and if not, processing returns to step S2506.

Figure 26:
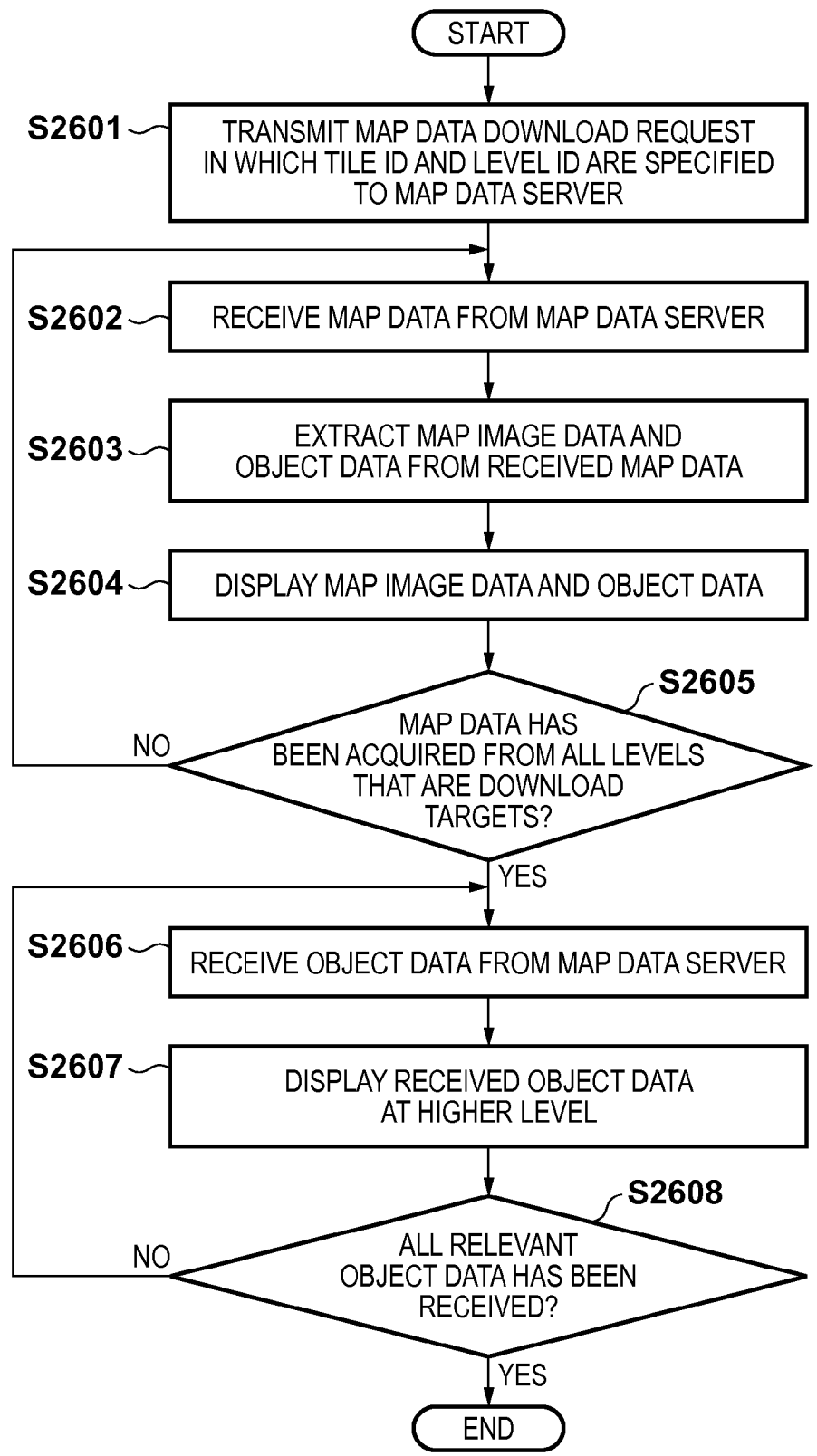
FIG. 26 is a flowchart of processing performed by a map display client.

Next, processing performed by the map display client for acquiring the map data from the map data serer will be discussed using FIG. 26 showing the flowchart of this processing. In step S2601, the communicating unit 2303 transmits a transmission request including level IDs and tile IDs to the map data server via the network 2390. In step S2602, the communicating unit 2303 receives the map data transmitted from the map data server in accordance with the transmission request.

In step S2603, a display managing unit 2301 extracts map image data and object data from the map data received by the communicating unit 2303. In step S2604, the display managing unit 2301 displays a map and an object based on each set of the extracted data.

In step S2605, the display managing unit 2301 determines whether or not the map data at all levels requested from the map data server has been received. As a result of the determination, if the map data at all levels has been received, processing proceeds to step S2606, and if map data at a level that has not been received yet remains, processing returns to step S2602.

In step S2606, the communicating unit 2303 receives the object data transmitted in step S2508. In step S2607, the display managing unit 2301 stores, in the storage device 2315, the object data received in step S2606 as data regarding the objects to be displayed at the highest level (the level with the largest level ID) among the levels requested from the map data server. For example, it is assumed that the map data at the level 1 and the level 5 has been requested from the map data server, and that the map data that is currently being displayed on the map display client side is at the level 5 (the level C2 on the map display client side). In this case, the objects are composited and displayed based on the object data received in step S2606.

In step S2608, the communicating unit 2303 determines whether or not all object data transmitted in step S2508 has been received. As a result of the determination, if all object data has been received, the present processing is ended, and if object data that has not been received yet remains, processing returns to step S2606.

As described above, according to the present embodiment, it is possible, in a small device such as one for downloading only part of the map data from a server and holding it, to separately download and display only the objects in which the user is interested. It is thereby possible to suppress data traffic and present information useful in a search to the user. Note that the above embodiments may be combined for use as appropriate.

Fourteenth Embodiment

In the above embodiments, data such as the map image and the objects are stored in the information processing apparatus, but possible modes for implementing the present invention are not limited thereto. FIG. 28 shows a module configuration in the present embodiment. In the present embodiment, a server 2810 that includes units (2811 to 2816), and a client terminal 2801 that includes units (2802 and 2803) are used. Upon the client terminal 2801 connecting to the server 2810 via a network 2890 and giving the server 2810 an instruction to display a map, the units (2811 to 2816) on the server 2810 execute map display processing in accordance with the method in the above embodiments, and create display image data. The client terminal 2801 acquires the display image data from the server 2810 and displays the acquired display image data on a display managing unit 2802. As described above, the present invention can be implemented also in the mode in which the device that performs the map display processing and the device that actually displays the map are separate. Here, the data necessary for executing the map display processing, such as the additional position information and the inter-object link information, can be created by inputting the data from the client terminal 2801 via the network 2890, and an embodiment that includes a units therefor is also included in the present invention.

Fifteenth Embodiment

Each unit in FIG. 2 may be configured with hardware, while, alternatively, the storage device 205 may be configured with a memory such as a hard disk, and other units may be configured with software (computer program). An exemplary configuration of a computer that includes a memory serving as the storage device 205 and a memory for holding the aforementioned software is shown in FIG. 10.

A CPU 1001 executes processing using computer programs and data stored in a ROM 1002 and a RAM 1003, thereby executing various kinds of processing including operation control of the entire computer.

The ROM 1002 stores setting data, a boot program, and the like of the computer. The RAM 1003 has an area for temporarily storing computer programs and data loaded from an external storage device 1007, and data received by a communicating unit 1009 via the network. Further, the RAM 1003 has a work area used by the CPU 1001 when executing various kinds of processing. In other words, the RAM 1003 can provide various areas as needed.

An input device 1005 is configured with a keyboard, a mouse, or the like, and the user can input various instructions (an input instruction to designate the scale and the display range of the map to be displayed, an instruction to display the map, etc.) to the CPU 1001 by operating the input device 1005.

A display device 1006 is configured with a CRT, a liquid-crystal screen, or the like, and can display the result of processing by the CPU 1001 with images, characters, and the like. For example, a display target to be displayed in step S917 above is displayed on the display device 1006.

The external storage device 1007 is a mass information storage device such as a hard disk. In the external storage device 1007, an OS (operating system), computer programs and data for causing the CPU 1001 to execute processing according to the above-described flowcharts, and the like are stored. The stored computer programs are computer programs for causing the CPU 1001 to execute functions corresponding to the above-described functional units, which are the display managing unit 201, the map image data managing unit 202, the object managing unit 203, and the additional position information managing unit 204. The stored data includes the data shown in FIGS. 3 to 6, 11, 12, 15, 16, and 17. The computer programs and data stored in the external storage device 1007 are loaded into the RAM 1003 as needed in accordance with the control by the CPU 1001, and are targeted for execution by the CPU 1001.

The input device 1005, the display device 1006, and the external storage device 1007 are all connected to an interface 1008. The communicating unit 1009 controls data communication with external devices via the network, and various instructions, data, and the like described above can be transmitted and received via the communicating unit 1009.

The CPU 1001, the ROM 1002, the RAM 1003, the interface 1008, and the communicating unit 1009 are all connected to a common bus 1004, and are able to communicate with one another.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-056490 filed Mar. 13, 2012 and No. 2012-161963 filed Jul. 20, 2012 which are hereby incorporated by reference herein in their entirety.

What is claimed is:

1. An information processing apparatus that composites and displays a map image at a designated scale and an object associated with the map image at the designated scale, comprising:
a processor;
a first memory storing instructions that when executed by the processor cause the processor to perform the steps of:
receiving data representing the object with the processor;
storing, by the processor, an object record including the data representing the object, an object identifier, a scale associated with the object and object position information regarding a position at which the data representing the object is displayed on the map image in a second memory;
receiving, by the processor, an image, extracting, by the processor, location information from the image, determining a position information record including position information corresponding to the location information, and updating an input state of the position information record;
determining, by the processor, that the updated input state satisfies a predetermined condition, and based on this determination, retrieving the object record held in the second memory based on the position information of the position information record and the object position information of the object record;
associating, by the processor, the retrieved object record with a map image at a scale that has a smaller scale ratio and shows a larger area than a map image at the scale associated with the object, wherein the associating comprises:
locating a display scale data record corresponding to the object using the object identifier of the retrieved object record;
updating a display scale level in the display scale data record to a scale that has the smaller scale ratio and shows the larger area than the scale associated with the object; and
displaying, by a display, a map image at the updated scale;
determining, by the processor, after displaying the map image, that the object record corresponds to the updated scale using the updated display scale of the display scale data record;
displaying, by the display, the data representing the object from the object record along with the map image.

2. The information processing apparatus according to claim 1,
wherein the instructions further cause the processor to perform the steps of:
storing in the second memory, in the position information record, identification information identifying a user who performed input with respect to the position information, in association with the position information of the position information record, and
wherein determining that the updated input state satisfies the predetermined condition comprises determining, for each piece of identification information, whether an input state of a position information record corresponding to the identification information satisfies the predetermined condition.

3. The information processing apparatus according to claim 1, wherein the display displays the data representing the object on the map image at the updated scale that shows the larger area, based on a difference between the updated scale of the map image associated with the object and the designated scale of the map image associated with the object.

4. The information processing apparatus according to claim 1, wherein the display displays, on the map image at the designated scale, another object stored in the second memory and the data representing the object corresponding to the object record associated with the position information record whose input state satisfies the predetermined condition in different display modes.

5. The information processing apparatus according to claim 1, wherein the display composites and displays another object that is set in advance as belonging to a category related to the object record stored in the second memory in association with the position information record whose input state satisfies the predetermined condition, among objects stored in the second memory, and the map image at the designated scale.

6. The information processing apparatus according to claim 1, wherein each object is a place name.

7. The information processing apparatus according to claim 1, wherein each object is a landmark name.

8. The information processing apparatus according to claim 1, wherein the object position information, the position information of the position information record, and the location information are each expressed by a combination of a latitude and a longitude.

9. The information processing apparatus according to claim 1, wherein the input state is a number of times that a picture taken at a position represented by the position information has been input to the information processing apparatus.

10. The information processing apparatus according to claim 1, wherein the display determines whether or not to perform display at a current time, using a difference between the updated scale of the map image displayed by the display and the designated scale of the map image.

11. An information processing method for compositing and displaying a map image at a designated scale and an object associated with the map image at the designated scale, comprising:
receiving data representing the object by a processor;
storing, by the processor, an object record including the data representing the object, an object identifier, a scale associated with the object and object position information regarding a position at which the data representing the object is displayed on the map image, in a first memory;
receiving, by the processor, an image, extracting, by the processor, location information from the image, determining, by the processor, a position information record including position information corresponding to the location information, and updating, by the processor, an input state of the position information record;
determining, by the processor, that the updated input state satisfies a predetermined condition, and based on this determination, retrieving, by the processor, the object record held in the first memory based on the position information of the position information record and the object position information of the object record;
associating, by the processor, the retrieved object record with a map image at a scale that has a smaller scale ratio and shows a larger area than a map image at the scale associated with the object, wherein the associating comprises:

locating, by the processor, a display scale data record corresponding to the object using the object identifier of the retrieved object record;

updating, by the processor, a display scale level in the display scale data record to a scale that has the smaller scale ratio and shows the larger area than the scale associated with the object; and displaying by a display a map image at the updated scale;

determining, by the processor, after displaying the map image, that the object record corresponds to the updated scale using the updated display scale of the display scale data record;

displaying, by the display, the data representing the object from the object record along with the map image.

12. A non-transitory computer-readable storage medium that stores a computer program that when executed by a computer causes the computer to perform the steps of:

receiving data representing the object by the computer;

storing, by the computer, an object record including the data representing the object, an object identifier, a scale associated with the object and object position information regarding a position at which the data representing the object is displayed on the map image in a first memory;

receiving, by the computer, an image, extracting, by the computer, location information from the image, determining a position information record including position information corresponding to the location information, and updating an input state of the position information record;

determining, by the computer, that the updated input state satisfies a predetermined condition, and based on this determination, retrieving the object record held in the first memory based on the position information of the position information record and the object position information of the object record;

associating, by the computer, the retrieved object record with a map image at a scale that has a smaller scale ratio and shows a larger area than a map image at the scale associated with the object, wherein the associating comprises:

locating a display scale data record corresponding to the object using the object identifier of the retrieved object record;

updating a display scale level in the display scale data record to a scale that has the smaller scale ratio and shows the larger area than the scale associated with the object; and displaying, by a display, a map image at the updated scale;

determining, by the computer, after displaying the map image, that the object record corresponds to the updated scale using the updated display scale of the display scale data record;

displaying, by the display, the data representing the object from the object record along with the map image.

13. An information processing apparatus that composites and displays a map image at a designated scale and an object associated with the map image at the designated scale, comprising:

a processor;

a first memory storing instructions that when executed by the processor cause the processor to perform the steps of:

receiving data representing the object with the processor;

storing, by the processor, an object record including the data representing the object, an object identifier, a scale of the map image associated with the object and object position information regarding a position at which the data representing the object is displayed on the map image in a second memory;

receiving, by the processor, data representing an event, extracting, by the processor, location information from the data representing the event, determining a position information record including position information corresponding to the location information, and updating an input state of the position information record;

determining, by the processor, that the updated input state satisfies a predetermined condition, and based on this determination, retrieving the object record held in the second memory based on the position information of the position information record and the object position information of the object record;

associating, by the processor, the retrieved object record with a map image at a scale that has a smaller scale ratio and shows a larger area than a map image at the scale associated with the object, wherein the associating comprises:

locating a display scale data record corresponding to the object using the object identifier of the retrieved object record;

updating a display scale level in the display scale data record to a scale that has the smaller scale ratio and shows the larger area than the scale associated with the object; and displaying, by a display, a map image at the updated scale;

determining, by the processor, after displaying the map image, that the object record corresponds to the updated scale using the updated display scale of the display scale data record;

displaying, by the display, the data representing the object from the object record along with the map image.

14. An information processing method that composites and displays a map image at a designated scale and an object associated with the map image at the designated scale, comprising the steps of receiving data representing the object by a processor;

storing, by the processor, an object record including the data representing the object, an object identifier, a scale of the map image associated with the object and object position information regarding a position at which the data representing the object is displayed on the map image in a memory;

receiving, by the processor, data representing an event, extracting, by the processor, location information from the data representing the event, determining, by the processor, a position information record including position information corresponding to the location information, and updating, by the processor, an input state of the position information record;

determining, by the processor, that the updated input state satisfies a predetermined condition, and based on this determination, retrieving, by the processor, the object record held in the memory based on the position information of the position information record and the object position information of the object record;

associating, by the processor, the retrieved object record with a map image at a scale that has a smaller scale ratio and shows a larger area than a map image at the scale associated with the object, wherein the associating comprises:

locating, by the processor, a display scale data record corresponding to the object using the object identifier of the retrieved object record;

updating, by the processor, a display scale level in the display scale data record to a scale that has the smaller scale ratio and shows the larger area than the scale associated with the object; and displaying, by a display, a map image at the updated scale;

determining, by the processor, after displaying the map image, that the object record corresponds to the updated scale using the updated display scale of the display scale data record;

displaying, by the display, the data representing the object from the object record along with the map image.

15. A non-transitory computer-readable storage medium that stores a computer program that when executed by a computer causes the computer to perform a method that composites and displays a map image at a designated scale and an object associated with the map image at the designated scale, comprising the steps of:

receiving data representing an object with the computer;

storing, by the computer, an object record including the data representing the object, an object identifier, a scale of the map image associated with the object and object position information regarding a position at which the data representing the object is displayed on the map image in a memory;

receiving, by the computer, data representing an event, extracting, by the computer, location information from the data representing the event, determining a position information record including position information corresponding to the location information, and updating an input state of the position information record;

determining, by the computer, that the updated input state satisfies a predetermined condition, and based on this determination, retrieving, by the computer, the object record held in the memory based on the position information of the position information record and the object position information of the object record;

associating, by the computer, the retrieved object record with a map image at a scale that has a smaller scale ratio and shows a larger area than a map image at the scale associated with the object, wherein the associating comprises:

locating a display scale data record corresponding to the object using the object identifier of the retrieved object record;

updating a display scale level in the display scale data record to a scale that has the smaller scale ratio and shows the larger area than the scale associated with the object; and displaying, by a display, a map image at the updated scale;

determining, by the computer, after displaying the map image, that the object record corresponds to the updated scale using the updated display scale of the display scale data record;

displaying, by the display, the data representing the object from the object record along with the map image.

* * * * *